US011742838B2

United States Patent
Kim et al.

(10) Patent No.: US 11,742,838 B2
(45) Date of Patent: Aug. 29, 2023

(54) FLIP FLOP AND DESIGN METHOD FOR INTEGRATED CIRCUIT INCLUDING THE SAME

(71) Applicant: SAMSUNG ELECTRONICS CO., LTD., Suwon-si (KR)

(72) Inventors: Ahreum Kim, Daegu (KR); Youngo Lee, Hwaseong-si (KR); Minsu Kim, Hwaseong-si (KR); Eunhee Choi, Seoul (KR)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 17/707,044

(22) Filed: Mar. 29, 2022

(65) Prior Publication Data

US 2022/0329234 A1  Oct. 13, 2022

(30) Foreign Application Priority Data

Apr. 8, 2021  (KR) .................. 10-2021-0046098

(51) Int. Cl.
| | |
|---|---|
| *H03K 3/00* | (2006.01) |
| *H03K 3/037* | (2006.01) |
| *G06F 30/392* | (2020.01) |
| *H03K 17/687* | (2006.01) |
| *H03K 19/20* | (2006.01) |
| *H03K 3/0233* | (2006.01) |

(52) U.S. Cl.
CPC .......... *H03K 3/0372* (2013.01); *G06F 30/392* (2020.01); *H03K 3/02332* (2013.01); *H03K 17/6872* (2013.01); *H03K 19/20* (2013.01)

(58) Field of Classification Search
CPC ............ H03K 3/0372; H03K 3/02332; H03K 17/6872; H03K 19/20
See application file for complete search history.

(56) References Cited

U.S. PATENT DOCUMENTS

| | | | | |
|---|---|---|---|---|
| 3,609,569 | A * | 9/1971 | Todd | H03K 3/0372 327/225 |
| 6,208,188 | B1 * | 3/2001 | Shionoya | H03K 3/0375 327/218 |
| 7,265,599 | B1 * | 9/2007 | Pasqualini | H03K 3/013 327/212 |
| 8,294,491 | B2 | 10/2012 | Ju et al. | |
| 8,547,155 | B2 | 10/2013 | Holst et al. | |
| 9,397,641 | B2 * | 7/2016 | Hsu | H03K 3/35625 |
| 9,641,161 | B1 | 5/2017 | Liu et al. | |
| 9,960,753 | B2 | 5/2018 | Hsu et al. | |
| 10,270,430 | B2 | 4/2019 | Guo et al. | |
| 10,396,761 | B2 * | 8/2019 | Hwang | H03K 3/35625 |
| 11,025,236 | B1 * | 6/2021 | Lai | H03K 3/3562 |
| 2020/0192997 | A1 | 6/2020 | Kim et al. | |

* cited by examiner

*Primary Examiner* — Tuan T Lam
(74) *Attorney, Agent, or Firm* — Fish & Richardson P.C.

(57) ABSTRACT

A flip-flop includes a first master latch in a first row, a second master latch in a second row, a first slave latch in the first row, and a second slave latch in the second row. The first master latch and the second master latch are adjacently disposed in the second direction, and the first slave latch and the second slave latch are adjacently disposed in the second direction.

21 Claims, 21 Drawing Sheets

FLIP FLOP AND DESIGN METHOD FOR INTEGRATED CIRCUIT INCLUDING THE SAME

CROSS-REFERENCE TO RELATED APPLICATION

This application claims priority under 35 U.S.C. § 119 to Korean Patent Application No. 10-2021-0046098 filed on Apr. 8, 2021 in the Korean Intellectual Property Office, the subject matter of which is hereby incorporated by reference in its entirety.

BACKGROUND

The inventive concept relates generally to flip-flops, and more particularly, to flip-flops implemented with signal routing that uses the gate electrode. The inventive concept also relates to design methods for integrated circuits (ICs) including flip-flop(s).

Contemporary and emerging semiconductor ICs are highly integrated to provide enhanced performance. Accordingly, the number of flip-flops included in such ICs has greatly increased and is expected to further increase.

A flip-flop may be used as a data storage element, wherein the binary state of the flip-flop may be interpreted as respective data values 1 and 0. Thus, the flip-flop is an electronic circuit capable of storing and retaining 1-bit information. As such the flip-flop is a basic element of many logic circuits (e.g., sequential logic circuits). The flip-flop may be variously implemented using a plurality of transistors. However, the increasing integration density of ICs and the resulting inclusion of many more flip-flops results in ever more complex signal routing between the constituent transistors. Such complex signal routing is undesirable and approaches are sought to alleviate it.

SUMMARY

Embodiments of the inventive concept provide flip-flops implemented as a multiple height cell, wherein the flip-flops implement signal routing approaches that use the gate electrode and may be fabricated across a plurality of rows.

Embodiments of the inventive concept also provide design methods for ICs including such flip-flops.

According to one aspect of the inventive concept, there is provided a flip-flop disposed across a first row and a second row extending in a first direction and adjacently disposed in a second direction perpendicular to the first direction. The flip-flop includes; a first sub-master latch disposed in one of the first row and the second row, and configured to generate a signal at a first node in response to a first data signal, a clock signal, and a signal at a second node, a second sub-master latch disposed in one of the first row and the second row, and configured to generate a signal at the second node in response to an inverted first data signal, the clock signal, and the signal at the first node, a first sub-slave latch disposed in one of the first row and the second row, and configured to generate a signal at a third node in response to the clock signal, the signal at the first node, and a signal at a fourth node, and a second sub-slave latch disposed in one of the first row and the second row, and configured to generate the signal at the fourth node in response to the clock signal, the signal at the second node, and the signal at the third node, wherein the first sub-master latch and the second sub-master latch are adjacently disposed in the second direction, and the first sub-slave latch and the second sub-slave latch are adjacently disposed in the second direction.

According to another aspect of the inventive concept, there is provided a flip-flop disposed across a first row and a second row extending in a first direction and adjacently disposed in a second direction perpendicular to the first direction. The flip-flop includes; a first sub-master latch disposed in one of the first row and the second row, and configured to generate a signal at a first node in response to a first data signal, a clock signal, and a signal at a second node, a second sub-master latch disposed in one of the first row and the second row, and configured to generate a signal at the second node in response to an inverted first data signal, the clock signal, and the signal at the first node, a first sub-slave latch disposed in one of the first row and the second row, and configured to generate a signal at a third node in response to the clock signal, the signal at the first node, and a signal at a fourth node, a second sub-slave latch disposed in one of the first row and the second row, and configured to generate the signal at the fourth node in response to the clock signal, the signal at the second node, and the signal at the third node, a selection circuit disposed in the first row, and configured to output one of a scan input signal and the first data signal in response to a scan enable signal, a scan inverter disposed in the second row, and configured to receive the scan enable signal and generate an inverted scan enable signal by inverting the scan enable signal, a second input inverter disposed in the second row, and configured to receive the first data signal and invert the first data signal, and a second output inverter disposed in the second row, and configured to invert the signal at the fourth node, wherein the first sub-master latch and the second sub-slave latch are adjacently disposed in the second direction, and the first sub-slave latch and the second sub-master latch are adjacently disposed in the second direction.

According to another aspect of the inventive concept, there is provided a design method for an integrated circuit (IC) including a flip-flop, wherein the flip-flop includes a first master latch, a second master latch, a first slave latch and a second slave latch extending in a first direction, arranged across a plurality of rows, and adjacently disposed in a second direction perpendicular to the first direction. The method includes; placing a first cell in response to input data defining the IC, wherein the first cell includes the first master latch and the second master latch adjacent in the second direction, and the first slave latch and the second slave latch adjacent in the second direction, placing a second cell in response to input data defining the IC, wherein the second cell includes the first master latch and the second slave latch adjacent in the second direction, and the first slave latch and the second master latch adjacent in the second direction, and generating output data defining a layout of the IC.

BRIEF DESCRIPTION OF THE DRAWINGS

The making and use of the inventive concept may be clearly understood upon consideration of the following detailed description taken in conjunction with the accompanying drawings. in which.

DETAILED DESCRIPTION

Throughout the written description and drawings, like reference numbers and labels are used to denote like or similar elements, components and./or method steps. Throughout the written description certain geometric terms may be used to highlight relative relationships between elements, components and/or features with respect to certain embodiments of the inventive concept. Those skilled in the art will recognize that such geometric terms are relative in nature, arbitrary in descriptive relationship(s) and/or directed to aspect(s) of the illustrated embodiments. Geometric terms may include, for example: height/width; vertical/horizontal; top/bottom; higher/lower; closer/farther; thicker/thinner; proximate/distant; above/below; under/over; upper/lower; center/side; surrounding; overlay/underlay; etc.

Figure 1:
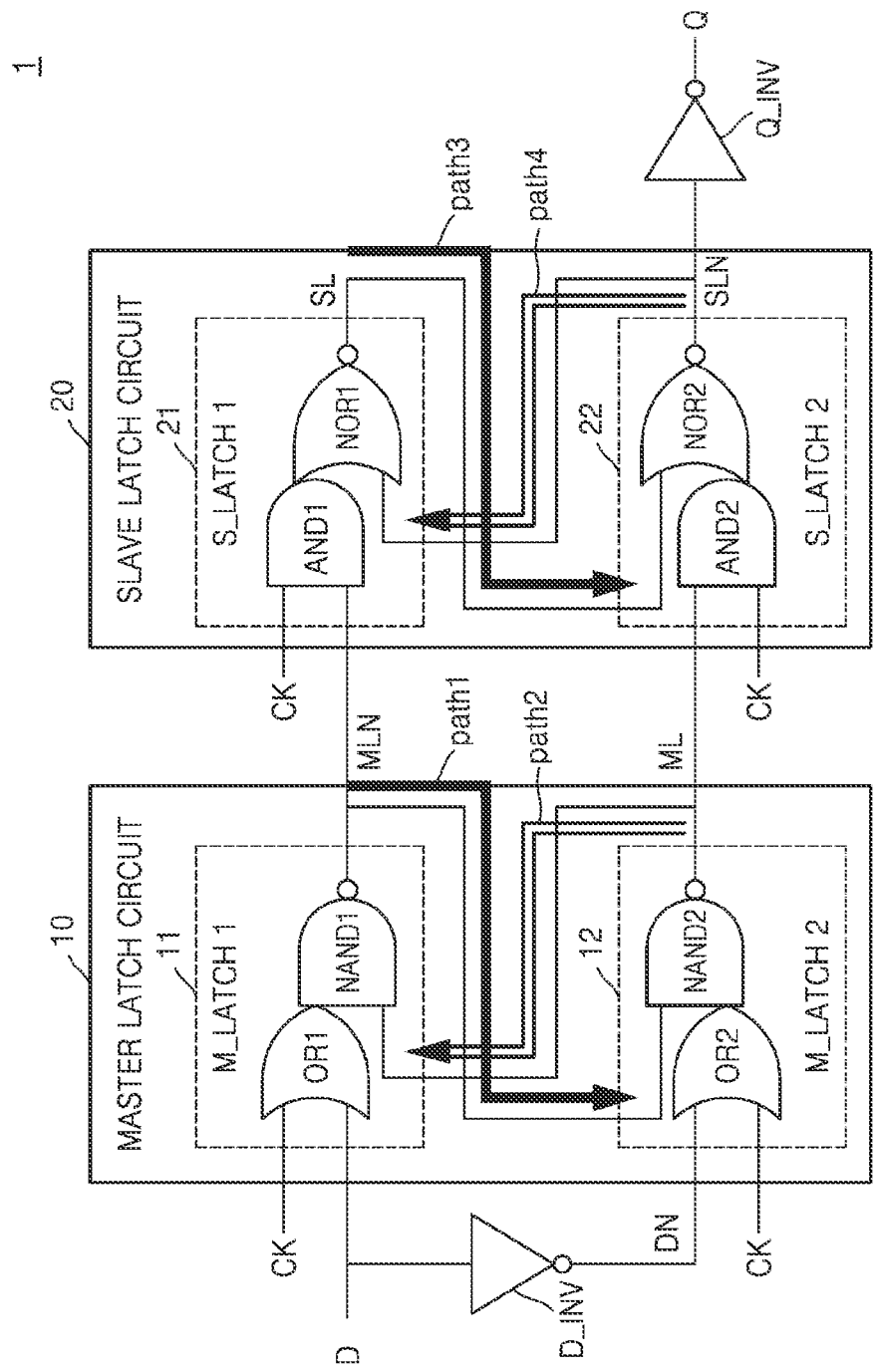
FIG. 1 is a circuit diagram illustrating a flip-flop according to embodiments of the inventive concept.

Figure (FIG. 1 is a circuit diagram illustrating a flip-flop 1 according to embodiments of the inventive concept. The flip-flop 1 may be a sequential circuit that receives a data signal D and outputs an output signal Q in response to a clock signal CK.

Referring to FIG. 1, the flip-flop 1 may include a data inverter D_INV, a master latch circuit 10, a slave latch circuit 20 and an output inverter Q_INV. The data inverter D_INV may receive the data signal D and invert the data signal D to generate an inverted data signal DN. The output inverter Q_INV may receive a second slave output signal SLN and invert the second slave output signal SLN to generate the output signal Q. In some embodiments, the flip-flop 1 may perform a RESET or SET function. For example, the flip-flop 1 may receive a RESET signal or a set signal, and may maintain the output signal Q at a predetermined logic level in response to the reset signal or the set signal. The flip-flop 1 may further include an additional logic gate not shown in FIG. 1 to perform the RESET or SET function.

The master latch circuit 10 may include a first sub-master latch circuit 11 and a second sub-master latch circuit 12.

The first sub-master latch circuit 11 may receive a logic level of the data signal D and a logic level of a first master node ML, and determine a logic level of a second master node MLN in response to the clock signal CK. The second sub-master latch circuit 12 may receive a logic level of the inverted data signal DN and the logic level of the second master node MLN, and determine the logic level of the first master node ML according to the clock signal CK. The logic level may be either a logically "high" level or a logically "low" level. When a node is precharged with a positive supply voltage VDD, a logic level of the node may be expressed as high, and when the node is precharged with a negative supply voltage VSS, the logic level of the node may be expressed as low. An output of the first sub-master latch circuit 11 is fed back to the second sub-master latch circuit 12, and an output of the second sub-master latch circuit 12 is fed back to the first sub-master latch circuit 11, and thus, the logic levels of the first master node ML and the second master node MLN may be stably maintained.

Referring to FIG. 1, the logic level of the first master node ML may be transmitted to the first sub-master latch circuit 11 through a second path (path 2), and the logic level of the second master node MLN may be transmitted to the second sub-master latch circuit 12 through a first path (path 1). That is, in order to stably maintain the logic levels of the first and second master nodes ML and MLN, a connection between the first and second master latch circuits 11 and 12 may be relatively complicated. Accordingly, in order to improve an integration of the flip-flop, the respective structures (or layouts) of the first path and the second path, as well as the method used to design the first path and the second path are highly relevant.

The slave latch circuit 20 may include a first sub-slave latch circuit 21 and a second sub-slave latch circuit 22.

The first sub-slave latch circuit 21 may receive the logic level of the second master node MLN and a logic level of a second slave node SLN, and determine a logic level of a first slave node SL according to the clock signal CK. The second sub-slave latch circuit 22 may receive the logic level of the first master node ML and the logic level of the first slave node SL, and determine the logic level of the second slave node SLN according to the clock signal CK. The output of the first sub-slave latch circuit 21 is fed back to an input of the second sub-slave latch circuit 22, and the output of the second sub-slave latch circuit 22 is fed back to an input of the first sub-slave latch circuit 21, and thus, the logic levels of the first slave node SL and the second slave node SLN may be stably maintained.

Referring to FIG. 1, the logic level of the first slave node SL may be transmitted to the second sub-slave latch circuit 22 through a third path (path 3), and the logic level of the second slave node SLN may be transmitted to the first sub-slave latch circuit 21 through a fourth path (path 4). That is, in order to stably maintain the logic levels of the first and second slave nodes SL and SLN, a connection between the first and second slave latch circuits 21 and 22 may be relatively complicated. Accordingly, in order to improve the integration of the flip-flop, the respective structures (or layouts) of the third path and the fourth path, as well as the method used to design the third path and the fourth path are highly relevant.

As will be described hereafter, the flip-flop 1 may be implemented as a multi-height standard cell, thereby reducing the overall complexity of the first path, the second path, the third path and the fourth path. Accordingly, the performance and integration of an integrated circuit (IC) including the flip-flop 1 may be improved.

Figure 2:
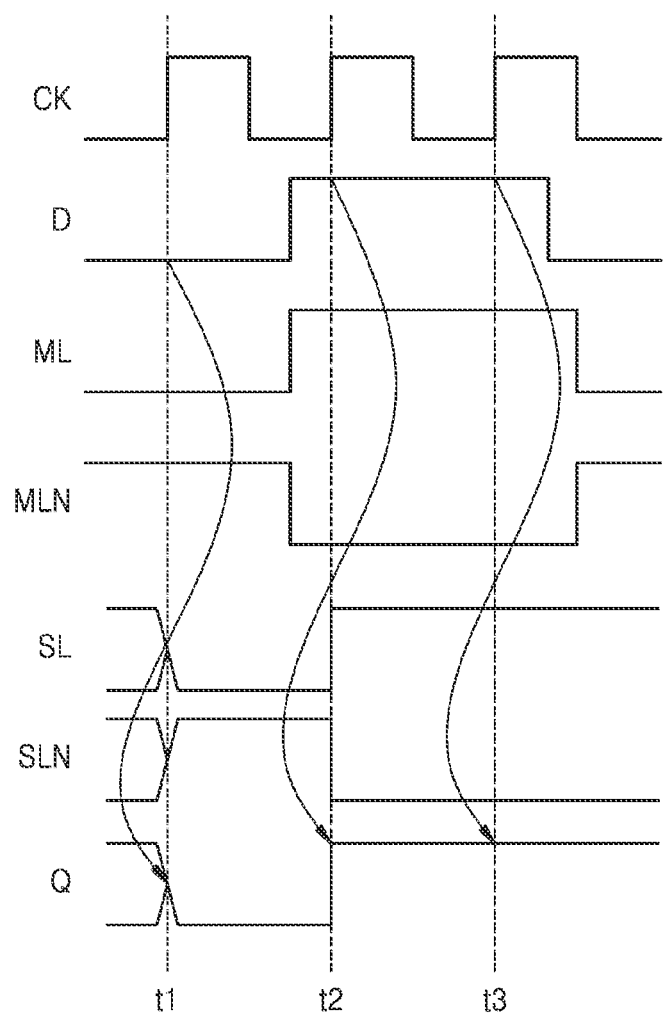
FIG. 2 is a timing diagram further illustrating the operation of the flip-flop of FIG. 1.

FIG. 2 is a timing diagram further illustrating the operation of the flip-flop 1 of FIG. 1.

Referring to FIGS. 1 and 2, the flip-flop 1 may latch the data signal D according to a rising edge of the clock signal CK to generate the output signal Q. Specifically, the flip-flop 1 may latch a logic level of the data signal D at first, second and third times t1, t2, and t3 when the rising edge of the clock signal CK is generated in order to determine a logic level of the output signal Q. For example, the flip-flop 1 may latch a low for the data signal D at t1 to determine the logic level of the output signal Q as low, latch a high for the data signal D at t2 to determine the logic level of the output signal Q as high, and latch a high for the data signal D at t3 to determine the logic level of the output signal Q as high. However, the foregoing is merely one example and in other embodiments the flip-flop 1 may latch the data signal D according to a falling edge to generate the output signal Q.

The logic level of the first master node ML may be the same as the logic level of the data signal D when the logic level of the clock signal CK is low. The logic level of the first master node ML may be the same as the logic level of the data signal D immediately before the logic level of the clock signal CK transitions when the logic level of the clock signal CK transitions to high. The logic level of the second master node MLN may be the same as an inverted logic level of the logic level of the first master node ML.

The logic level of the first slave node SL may maintain a previous logic level when the logic level of the clock signal CK is low. The logic level of the first slave node SL may be the same as the logic level of the data signal D immediately before the logic level of the clock signal CK transitions when the logic level of the clock signal CK transitions to high. The logic level of the second slave node SLN may be the same as an inverted logic level of the logic level of the first slave node SL. Because the flip-flop 1 does not require an inverted clock signal CKN in which the logic level of the clock signal CK is inverted, the flip-flop 1 may not include a clock buffer or a clock inverter for generating the inverted clock signal CKN. Accordingly, the power consumed by the clock buffer or the clock inverter in response to the clock signal CK may be reduced.

Figure 3:
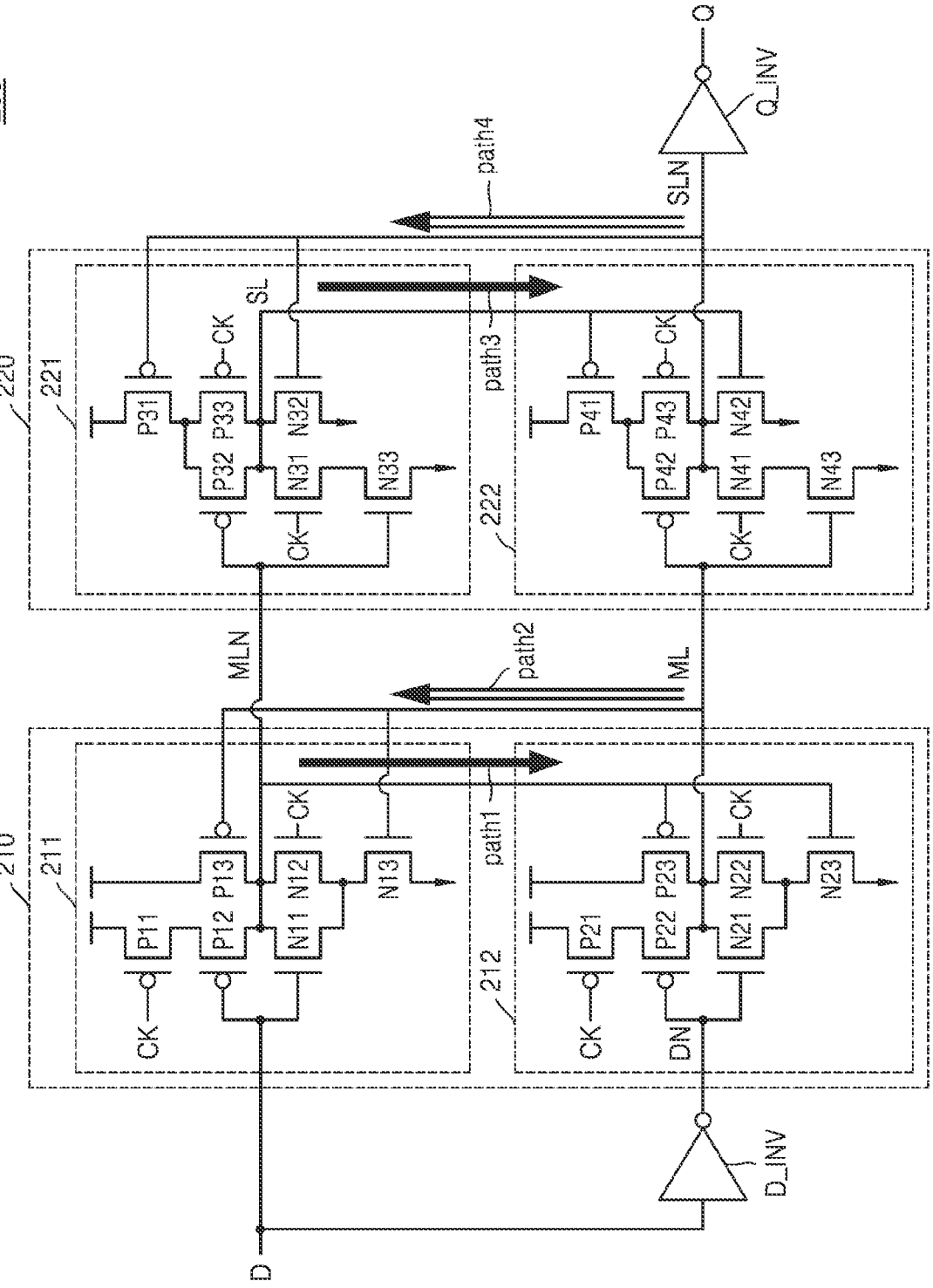
FIG. 3 is a transistor-level diagram further illustrating a flip-flop according to embodiments of the inventive concept.

FIG. 3 is a transistor level diagram illustrating a flip-flop 200 according to embodiments of the inventive concept.

Referring to FIG. 3, the flip-flop 200 may include a data inverter D_INV, a master latch circuit 210, a slave latch circuit 220, and an output inverter Q_INV. The flip-flop 200 of FIG. 3 may be of the transistor level of the flip-flop 1 of FIG. 1.

The master latch circuit 210 may include a first sub-master latch circuit 211 and a second sub-master latch circuit 212.

The first sub-master latch circuit 211 may include transistors P11, P12 and P13 (hereafter collectively, "P11 to P13"), as well as transistors N11, N12 and N13 (hereafter collectively, "N11 to N13"). The transistors P11 to P13 may be P-type transistors, but the embodiments are not limited thereto. The clock signal CK may be input to a gate terminal of transistor P11, the data signal D may be input to a gate terminal of transistor P12, and a signal at the first master node ML transmitted along the second path may be input to a gate terminal of transistor P13. The transistors N11 to N13 may be N-type transistors, but the embodiments are not limited thereto. The data signal D may be input to a gate terminal of transistor N11, the clock signal CK may be input to a gate terminal of transistor N12, and the signal at the first master node ML transmitted along the second path may be input to a gate terminal of transistor N13.

The second sub-master latch circuit 212 may have the same structure as the first sub-master latch circuit 211. That is, the second sub-master latch circuit 212 may include transistors P21, P22 and P23 as well as N21, N22 and N23, and description of the first sub-master latch circuit 211 may be analogously applied to the second sub-master latch circuit 212. Accordingly, a signal at the second master node MLN transmitted along the first path may be input to a gate terminal of transistor P23, and the signal at the second master node MLN transmitted along the first path may be input to a gate terminal of transistor N23.

The first sub-slave latch circuit 221 may include transistors P31, P32 and P33 as well as N31, N32 and N33. A signal at the second slave node SLN transmitted along the fourth path may be input to a gate terminal of transistor P31, the signal at the second master node MLN may be input to a gate terminal of transistor P32, and the clock signal CK may be input to a gate terminal of transistor P33. The clock signal CK may be input to a gate terminal of transistor N31, the signal at the second slave node SLN transmitted along the fourth path may be input to a gate terminal of transistor N32, and the signal at the second master node MLN may be input to a gate terminal of transistor N33.

The second sub-slave latch circuit 222 may have substantially the same structure as the first sub-slave latch circuit 211. That is, the second sub-slave latch circuit 222 may include transistors P41, P42 and P43 as well as N41, N42 and N43. Here, a signal at the first slave node SL transmitted along the third path may be input to a gate terminal of transistor P41, and the signal at the first slave node SL transmitted along the third path may be input to a gate terminal of transistor N42.

In the flip-flop 200, signal routing complexity may increase in relation to the first path, the second path, the third path and/or the fourth path (hereafter collectively, "first to fourth paths"). Accordingly, the respective structures of the first to fourth paths may be highly relevant to any attempts to reduce signal routing complexity.

Figure 4:
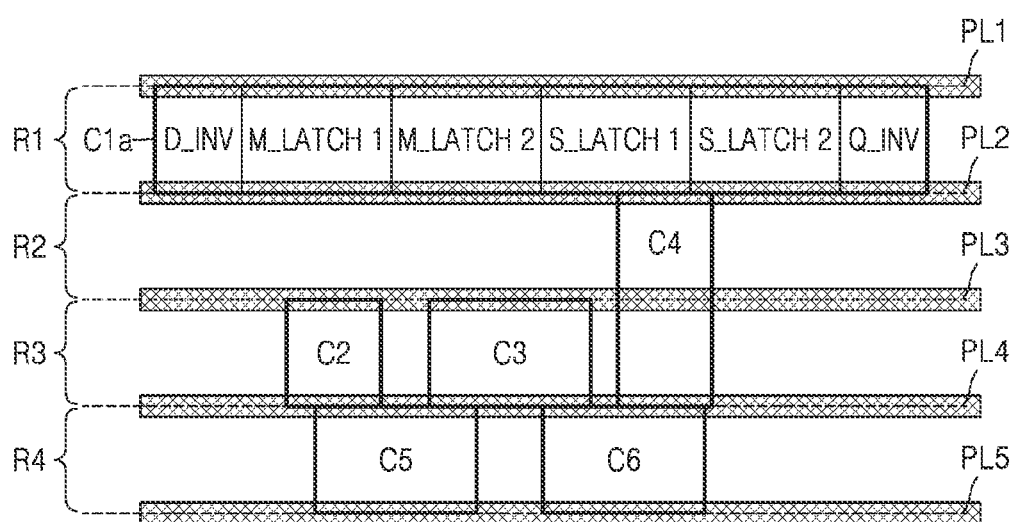
FIG. 4 is a layout (or top-down) diagram illustrating an integrated circuit (IC) according to embodiments of the inventive concept.

FIG. 4 is a layout diagram illustrating an IC 40 according to embodiments of the inventive concept. Here, the IC 40 may include first cell C1a, second cell C2, third cell C3, fourth cell C4, fifth cell C5 and sixth cell C6 (hereafter collectively, "first to sixth cells C1a to C6") disposed on a plane that may be defined according to a first direction (e.g., X-axis) and a second direction (e.g., Y-axis). In this regard, a vertical axis (e.g., Z-axis) may be orthogonally related to the horizontal (X/Y) plane, wherein a +Z direction denotes a higher level (or an "above" relationship), and a −Z direction denotes a lower level (or a "below" relationship).

As illustrated in FIG. 4, first to sixth cells C1a to C6 may be arranged in first row R1, second row R2, third row R3 and fourth row R4 (hereafter collectively, "first to fourth rows R1 to R4"). The first to fourth rows R1 to R4 may extend in the first direction. A cell may be understood as a layout unit that may be included in an IC. Each "standard cell" in a library of cells may be designed to perform one or more particular function(s). In this regard, the IC 40 may include (or be composed of) multiple cells, wherein each cell is arranged in relation to at least one row among a plurality of rows. Cells arranged in a single row (e.g., cells C1a, C2, C3, C5, and C6) may be referred to as "single height cells," whereas a cell continuously arranged across two or more rows (e.g., cell C4) may be referred to as a "multiple height cell."

First powerline P1, second powerline P2, third powerline P3, fourth power line P4 and fifth power line PL5 (hereafter collectively, first to fifth powerlines P1 to P5") may extend along (and define) respective boundaries for the first to fourth rows R1 to R4 in the first direction. A power line providing the positive supply voltage VDD and a power line providing the negative supply voltage VSS may be alternately disposed. For example, the first, third, and fifth power lines PL1, PL3, and PL5 may be power lines providing the positive supply voltage VDD, and the second and fourth power lines PL2 and PL4 may be power lines providing the negative supply voltage VSS. The first to fifth power lines PL1 to PL5 may be formed in a first wiring layer M1 in which respective wirings extend in the first direction.

The first cell C1a may be a cell corresponding to the flip-flop 1 of FIG. 1 (hereafter, a "flip-flop cell"). The first cell C1a may include a layout in which a block of the data inverter D_INV, a block of the first master latch M_LATCH 1, a block of the second master latch M_LATCH 2, a block of the first slave latch S_LATCH 1, a block of the second slave latch S_LATCH 2, and a block of the output inverter Q_INV are sequentially arranged in the first direction. In this regard, the term "block" may generally be used to denote a particular layout corresponding to a logic gate, a complex logic gate, a latch, etc.

As described with reference to FIG. 1, the logic level of the first master node ML may be transmitted to the first sub-master latch circuit 11 through the second path, the logic level of the second master node MLN may be transmitted to the second sub-master latch circuit 12 through the first path, the logic level of the first slave node SL may be transmitted to the second sub-slave circuit 22 through the third path, and the logic level of the second slave node SLN may be transmitted to the first sub-slave latch circuit 21 through the fourth path. Accordingly, as shown in FIG. 3, when the first cell Cia is a single-height cell, the first to fourth paths need to be formed in the first row R1, which may increase wiring complexity.

Figure 5:
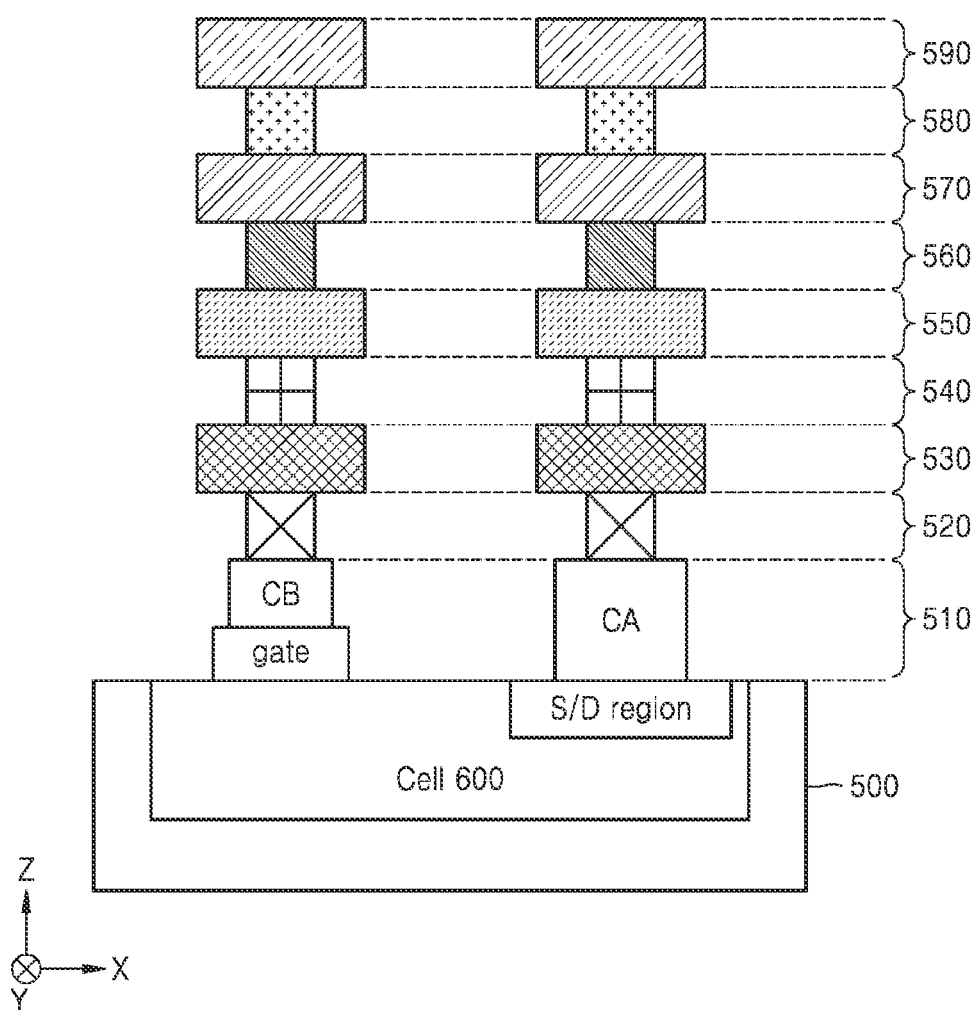
FIG. 5 is a cross-sectional diagram illustrating a wiring layer according to embodiments of the inventive concept.

FIG. 5 is a cross-sectional diagram illustrating a wiring layer according to embodiments of the inventive concept. Referring to FIG. 5, first layer 510, second layer 520, third layer 530, fourth layer 540, fifth layer 550, sixth layer 560, seventh layer 570, eighth layer 580 and ninth layer 590 (hereafter collectively, "layers 510 to 590") may be formed on a substrate 500. A cell 600 may be formed on the substrate 500, and may be one of the first to sixth cells C1a to C6 described with reference to FIG. 4. Here, FIG. 5 is presented as an idealized, cross-sectional diagram particularly illustrating layers 510 to 590 formed on the cell 600, whereas cross-sectional diagram(s) illustrating actual standard cell(s) may vary in relation to FIG. 5.

The first layer 510 may be referred to as a contact layer, and a gate contact CB connected to a gate electrode of a transistor and a source/drain contact CA connected to a source/drain S/D region of the transistor may be formed. The first layer 510 may be referred to as M0, and the cell 600 and the first layer 510 may be formed in a front end-of-line (FEOL) process.

The second layer 520 may be referred to as a contact via layer and may also be referred to as V0, the third layer 530 may be referred to as a first wiring layer M1, the fourth layer 540 may be referred to as a first via layer V1, the fifth layer 550 may be referred to as a second wiring layer M2, the sixth layer 560 may be referred to as a second via layer V2, the seventh layer 570 may be referred to as a third wiring layer M3, the eighth layer 580 may be referred to as a third via layer V3, and the ninth layer 590 may be referred to as a fourth wiring layer M4. The second to ninth layers 520 to 590 may be formed in a back end-of-line (BEOL) process. Here, it should be noted that only certain layers are shown in FIG. 5 and similar cross-sectional drawings for convenience of illustration, and in order to indicate connection(s) between a pattern of an upper wiring layer and a pattern of a lower wiring layer, vias are shown even though they may be located below the pattern of the upper wiring layer.

Figure 6:
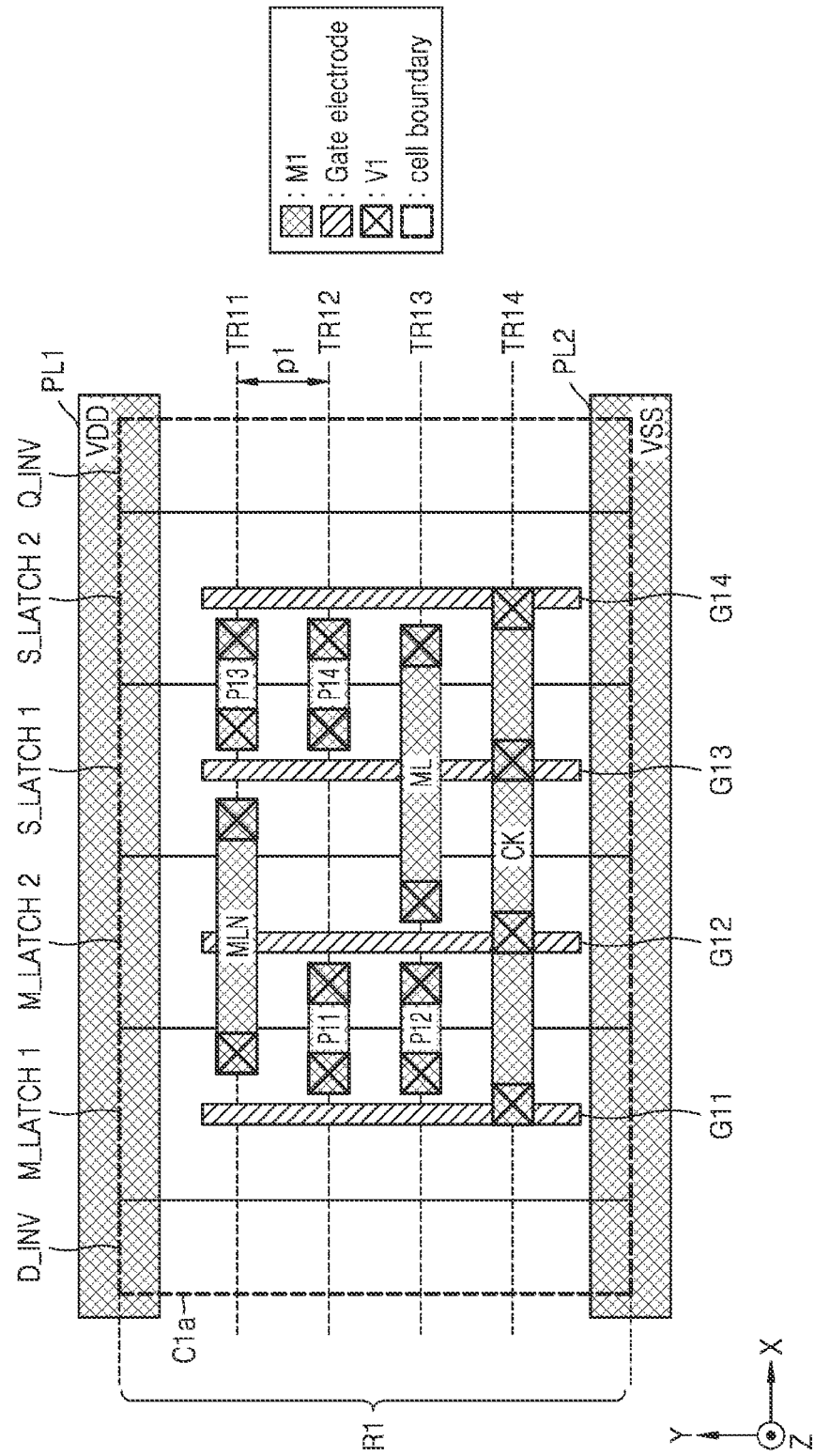
FIG. 6 is a layout diagram illustrating a single-height, flip-flop cell according to embodiments of the inventive concept.

FIG. 6 is a layout diagram illustrating a single height flip-flop cell according to embodiments of the inventive concept. That is, FIG. 6 is a plan view illustrating a layout of the first cell Cia described with reference to FIG. 4.

Referring to FIG. 6, the first cell C1a may be a single height cell disposed in a first row R1 extending in a first direction. Although not shown, the first cell C1a may include transistors constituting the flip-flop 200 as described with reference to FIG. 3. Here, the respective transistors may have various structures. That is, for example, one or more of the transistors may be a fin field effect transistor (FinFET) formed by an active pattern extending in a Fin shape and a gate electrode; a multi-bridge channel FET (MBCFET) formed by a gate electrode and a plurality of nanosheets extending parallel; a ForkFET in which nanosheets for a P-type transistor and nanosheets for an N-type transistor are separated by a dielectric wall such that the N-type transistor and the P-type transistor have a closer structure; a vertical FET (VFET) including vertically spaced apart source/drain regions and a gate electrode surrounding a channel region; a field effect transistor (FET)—such as a complementary FET (CFET), negative FET (NCFET), carbon nanotube (CNT) FET, etc., as well as bipolar junction transistors and other three-dimensional (3D) transistors.

Referring to FIG. 6, the first cell C1a may include a block of the data inverter D_INV, a block of the first master latch M_LATCH 1, a block of the second master latch M_LATCH 2, a block of the first slave latch S_LATCH 1, a block of the second slave latch S_LATCH 2, and a block of the output inverter Q_INV.

Wirings in the first wiring layer M1 in the first direction may interconnect blocks included in the first cell C1a. The wirings formed in the first wiring layer M1 may be aligned along a first track TR11, a second track TR12, a third track TR13 and a fourth track TR14 (hereafter collectively, "first to fourth tracks TR11 to TR14") spaced apart by a first pitch p1 to satisfy a design rule.

Specifically, the block of the data inverter D_INV may transmit an inverted data signal to the block of the second master latch M_LATCH 2. The block of the first master latch M_LATCH 1 may transmit a logic level of the second master node MLN to the block of the first slave latch S_LATCH 1 through a wiring of the second master node MLN. Although not shown, the wiring of the second master node MLN may be connected to a gate electrode included in the block of the first slave latch S_LATCH 1.

The block of the first master latch M_LATCH 1 may transmit the logic level of the second master node MLN to the block of the second master latch M_LATCH 2 through a first wiring P11. That is, the first wiring P11 may be included in a structure forming the first path. Although not shown, the first wiring P11 may be connected to a gate electrode included in the block of the second master latch M_LATCH 2.

The block of the second master latch M_LATCH 2 may transmit the logic level of the first master node ML to the block of the first master latch M_LATCH 1 through a second wiring P12. That is, the second wiring P12 may be included in a structure forming the second path. Although not shown, the second wiring P12 may be connected to a gate electrode included in the block of the first master latch M_LATCH 1.

The block of the second master latch M_LATCH 2 may transmit the logic level of the first master node ML to the block of the second slave latch S_LATCH 2 through a wiring of the first master node ML. Although not shown, the wiring of the first master node ML may be connected to a gate electrode included in the block of the second slave latch S_LATCH 2.

The block of the first slave latch S_LATCH 1 may transmit the logic level of the first slave node SL to the block of the second slave latch S_LATCH 2 through a third wiring P13. That is, the third wiring P13 may be included in a structure forming the third path. Although not shown, the third wiring P13 may be connected to a gate electrode included in the block of the second slave latch S_LATCH 2.

The block of the second slave latch S_LATCH 2 may transmit the logic level of the second slave node SLN to the block of the first slave latch S_LATCH 1 through a fourth wiring P14. That is, the fourth wiring P14 may be included in a structure forming the fourth path. Although not shown, the fourth wiring P14 may be connected to a gate electrode included in the block of the first slave latch S_LATCH 1.

The first cell C1a may include a first gate electrode G11, a second gate electrode G12, a third gate electrode G13 and a fourth gate electrodes (hereafter collectively, "first to fourth gate electrodes G11 to G14"). The first to fourth gate electrodes G11 to G14 may extend in the second direction, and may commonly receive the clock signal CK through a wiring of the clock CK. As shown in FIG. 6, when the cell C1a corresponding to the flip-flop 1 is arranged in row R1, the complexity of signal routing may increase, which may deteriorate a degree of freedom of the design and cell performance.

Figure 7:
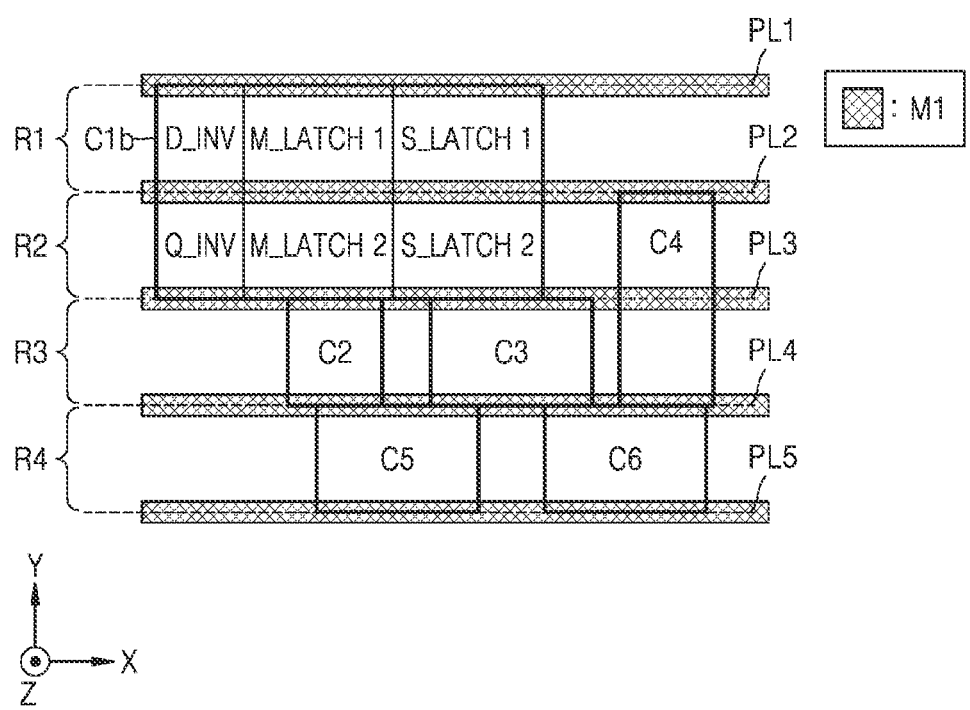
FIG. 7 is a layout diagram illustrating an IC according to embodiments of the inventive concept.

FIG. 7 is a layout diagram illustrating an IC 50 according to embodiments of the inventive concept. Here, the IC 50 may include first to sixth cells C1b to C6 disposed in a horizontal (X/Y) plane.

The IC 50 may include the first to sixth cells C1b to C6 arranged in first to fourth rows R1 to R4. However, in contrast to the first cell Cia of FIG. 4, the first cell C1b may be a multiple height cell. That is, the first cell C1b may be disposed across the first row R1 and the second row R2. More specifically, a block of the data inverter D_INV, a block of the first master latch M_LATCH 1, and a block of the first slave latch S_LATCH 1 may be arranged in the first row R1, and block of the output inverter Q_INV, a block of the second master latch M_LATCH 2, and a block of the second slave latch S_LATCH 2 may be arranged in the second row R2.

Alternatively, the block of the first master latch M_LATCH 1 and the block of the second master latch M_LATCH 2 may be swapped, and the block of the first slave latch S_LATCH 1 and the block of the second slave latch S_LATCH 2 may be swapped. That is, the block of the first master latch M_LATCH 1 and the block of the second master latch M_LATCH 2 may be disposed in the first and second rows R1 and R2 to be adjacent in a second direction, and the block of the first slave latch S_LATCH 1 and the block of the second slave latch S_LATCH 2 may be disposed in the first and second rows R1 and R2 to be adjacent in the second direction.

In FIG. 7, the blocks included in the master latch circuit 10 of FIG. 1, that is, the block of the first master latch M_LATCH 1 and the block of the second master latch M_LATCH 2, may be disposed adjacent to the left side of the blocks included in the slave latch circuit 20 of FIG. 1—or the block of the first slave latch S_LATCH 1 and the block of the second slave latch S_LATCH 2. Alternatively, the blocks included in the master latch circuit 10 (e.g., the block of the first master latch M_LATCH 1 and the block of the second master latch M_LATCH 2) may be disposed adjacent to the right side of the blocks included in the slave latch circuit 20 of FIG. 1, or the block of the first slave latch S_LATCH 1 and the block of the second slave latch S_LATCH 2.

The block of the first master latch M_LATCH 1 and the block of the second master latch M_LATCH 2 may be adjacently arranged in the second direction, so that the block of the first master latch M_LATCH 1 and the block of the second master latch M_LATCH 2 may share a gate electrode to which the clock signal CK is applied. The block of the first slave latch S_LATCH 1 and the block of the second slave latch S_LATCH 2 may be adjacently arranged in the second direction, so that the block of the first slave latch S_LATCH 1 and the block of the second slave latch S_LATCH 2 may share the gate electrode to which the clock signal CK is applied. Hereinafter, one example of the structure of the gate electrode will be described in some additional detail with reference to FIG. 8.

Accordingly, the first cell C1b is a multiple height cell, as compared with the first cell C1a of FIG. 4. And this structural difference allows the respective wirings forming the first to fourth paths to be disposed in a manner that reduces overall signal routing complexity.

Figure 8:
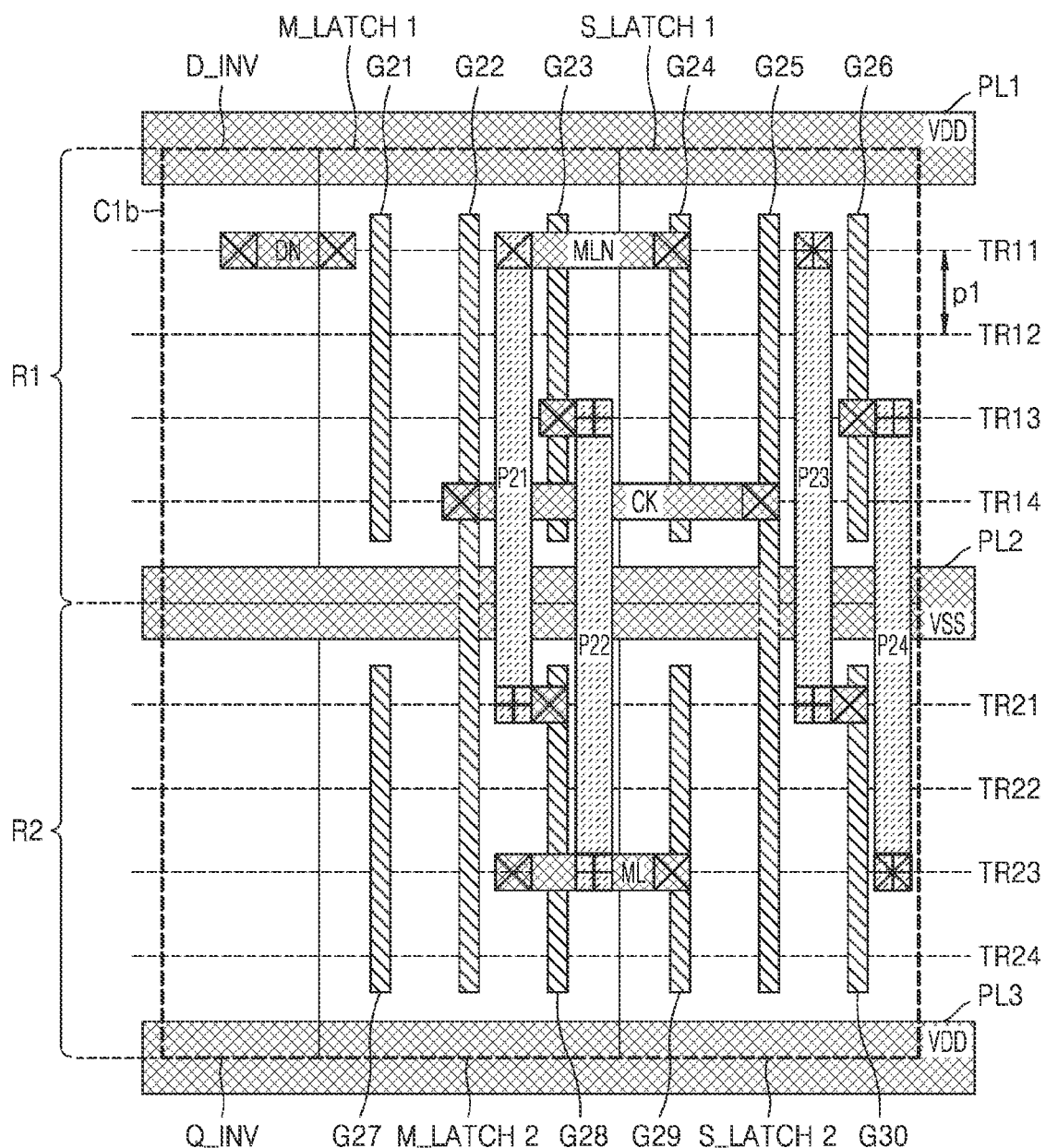
FIG. 8 is a layout diagram illustrating a multi-height flip-flop cell according to embodiments of the inventive concept.

FIG. 8 is a layout diagram illustrating in one example a multi-height flip-flop cell according to embodiments of the inventive concept. More specifically, FIG. 8 is a plan view illustrating a layout of the first cell C1b described with reference to FIG. 7 on a horizontal (X/Y) plane.

Referring to FIG. 8, the first cell C1b may be a multiple height cell disposed across the first row R1 and the second row R2 extending in a first direction. Although not shown in FIG. 8, the first cell C1b may include transistors constituting the flip-flop 200 described with reference to FIG. 4.

Referring to FIG. 8, in some embodiments, a block of the data inverter D_INV, a block of the first master latch M_LATCH 1, and a block of the first slave latch S_LATCH 1 may be arranged in the first row R1 and, a block of the output inverter Q_INV, a block of the second master latch M_LATCH 2, and a block of the second slave latch S_LATCH 2 may be arranged in the second row R2.

The block of the first master latch M_LATCH 1 and the block of the second master latch M_LATCH 2 may be disposed adjacent in a second direction, and the block of the first slave latch S_LATCH 1 and the block of the second master latch M_LATCH 2 may be disposed adjacent in the second direction.

The first cell C1*b* may include first to tenth gate electrodes G21 to G30. The second gate electrode G22 and the fifth gate electrode G25 may be continuously formed over (or extend across—wholly or in part) the first and second rows R1 and R2. The second gate electrode G22 may be connected to a wiring of the clock CK to commonly transmit a clock signal to the blocks of the first and second master latches M_LATCH 1 and M_LATCH 2. The fifth gate electrode G25 may be connected to the wiring of the clock CK to commonly transmit the clock signal to the blocks of the first and second slave latches S_LATCH 1 and S_LATCH 2. That is, the signal routing complexity associated with the wiring layers may be reduced by routing the clock signal through the gate electrode.

Wirings formed in the first wiring layer M1 in a first direction may interconnect blocks included in the first cell C1*b*. The wirings formed in the first wiring layer M1 may be aligned along the first to fourth tracks TR11 to TR14 and fifth to eighth tracks TR21 to TR24 in order to satisfy a design rule. The first to fourth tracks TR11 to TR14 may be spaced apart by the first pitch p1, and the fifth to eighth tracks TR21 to TR24 may be spaced apart by the first pitch p1.

The block of the first master latch M_LATCH 1 may transmit a logic level of the second master node MLN to the block of the first slave latch S_LATCH 1 through a wiring of the second master node MLN formed in the first wiring layer M1. The wiring of the second master node MLN may be connected to the fourth gate electrode G24 included in the block of the first slave latch S_LATCH 1.

The block of the first master latch M_LATCH 1 may transmit the logic level of the second master node MLN to the block of the second master latch M_LATCH 2 through the first wiring P21. The first wiring P21 may extend in the second direction and may be formed in the second wiring layer M2. The first wiring P21 may be electrically connected to the eighth gate electrode G28 included in the block of the second master latch M_LATCH 2. The first wiring P21 may have a structure that forms the first path.

The block of the second master latch M_LATCH 2 may transmit a logic level of the first master node ML to the block of the second slave latch S_LATCH 2 through a wiring of the first master node ML formed in the first wiring layer M1. The wiring of the first master node ML may be connected to the ninth gate electrode G29 included in the block of the second slave latch S_LATCH 2.

The block of the second slave latch S_LATCH 2 may transmit the logic level of the first master node ML to the block of the first master latch M_LATCH 1 through the second wiring P22 formed in the second wiring layer M2. The second wiring P22 may extend in the second direction and may be formed in the second wiring layer M2. The second wiring P22 may be electrically connected to the third gate electrode G23 included in the block of the first master latch M_LATCH 1. The second wiring P22 may have a structure that forms the second path.

The block of the first slave latch S_LATCH 1 may transmit a logic level of the first slave node SL to the block of the second slave latch S_LATCH 2 through the third wiring P23. The third wiring P23 may extend in the second direction and may be formed in the second wiring layer M2. The third wiring P23 may be electrically connected to the tenth gate electrode G30 included in the block of the second slave latch S_LATCH 2. The third wiring P23 may have a structure that forms the third path.

The block of the second slave latch S_LATCH 2 may transmit the logic level of the second slave node SLN to the block of the first slave latch S_LATCH 1 through the fourth wiring P24. The fourth wiring P24 may extend in the second direction and may be formed in the second wiring layer M2. The fourth wiring P24 may be electrically connected to the sixth gate electrode G26 included in the block of the first slave latch S_LATCH 1. The fourth wiring P24 may have a structure that forms the fourth path.

In the first cell C1*a* shown in FIG. 6, routing wirings are arranged along four tracks in one row. In the first cell C1*b* of FIG. 8, routing wirings may not be aligned along at least one track (e.g., the second track TR12, the sixth track TR22, or the eighth track TR24) within one row. Accordingly, the potential for interference between routing wirings may be reduced, and overall signal routing complexity for the flip-flop may be reduced.

Figure 9:
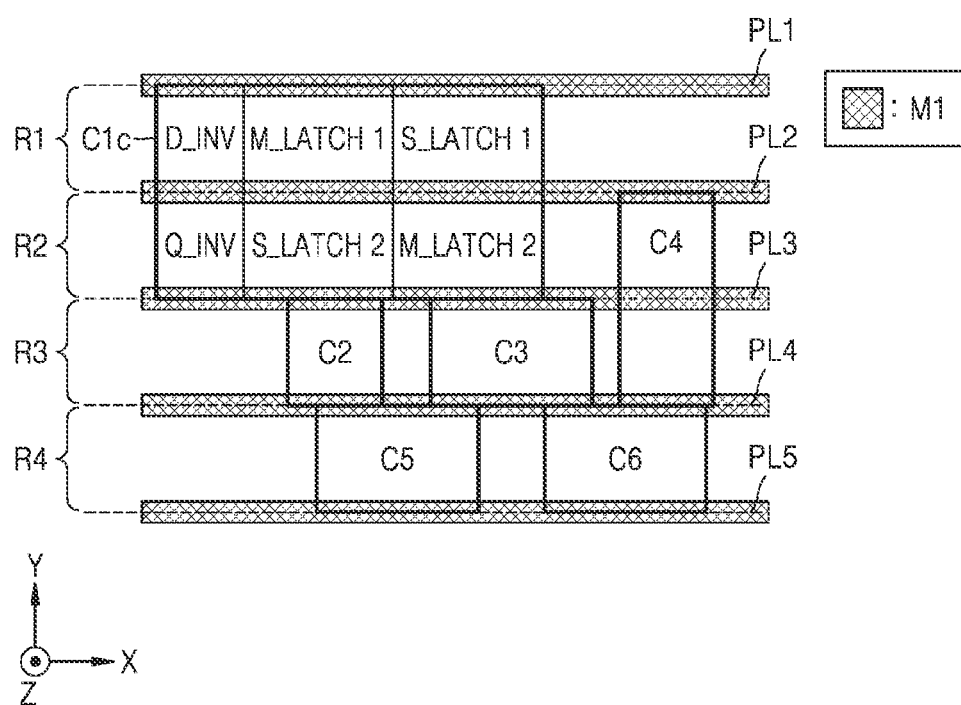
FIG. 9 is a layout diagram illustrating an IC according to embodiments of the inventive concept.

FIG. 9 is a layout diagram illustrating an IC 60 according to embodiments of the inventive concept. More specifically, FIG. 9 is a plan view illustrating the layout of the IC 60 including first to sixth cells C1*c* to C6 in a horizontal (X/Y) plane.

The first cell C1*c* included in the IC 60 may be a multiple height cell. In contrast to the first cell C1*b* of FIG. 7, a block of the first master latch M_LATCH 1 and a block of the second slave latch S_LATCH 2 may be arranged in the first and second rows R1 and R2 to be adjacent in a second direction. The block of the first master latch M_LATCH 1 and the block of the second slave latch S_LATCH 2 are adjacent in the second direction. Thus, the block of the first master latch M_LATCH 1 and the block of the second slave latch S_LATCH 2 may share a gate electrode to which the clock signal CK is applied as well as a gate electrode to which a signal at the first master node ML is applied. Accordingly, wiring complexity for the second path may be reduced. One example of a structure of the gate electrode will be described hereafter in some additional detail with reference to FIG. 10.

Also, a block of the first slave latch S_LATCH 1 and a block of the second master latch M_LATCH 2 may be disposed in the first and second rows R1 and R2 to be adjacent in the second direction. The block of the first slave latch S_LATCH 1 and the block of the second master latch M_LATCH 2 are adjacent in the second direction, and thus, the block of the first slave latch S_LATCH 1 and the block of the second master latch M_LATCH 2 may share the gate electrode to which the clock signal CK is applied as well as a gate electrode to which a signal at the second master node MLN is applied. Accordingly, wiring complexity for the first path may be reduced. A specific structure of the gate electrode may be described later with reference to FIG. 10.

Since the first cell C1*c* is a multiple height cell, the space in which wirings constituting the first to fourth paths included in the flip-flop 1 are arranged may increase, and overall signal routing complexity may be reduced.

Figure 10:
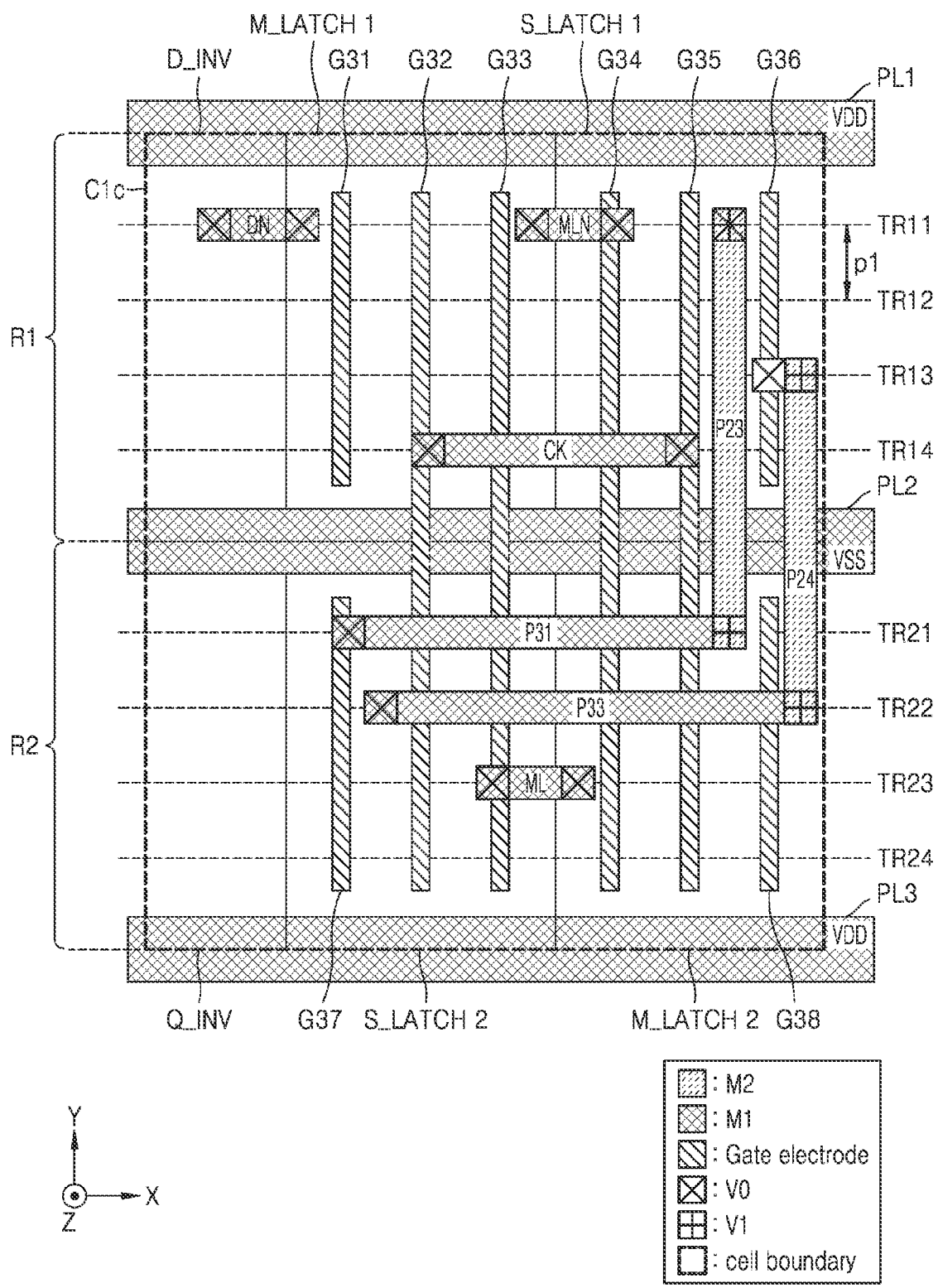
FIG. 10 is a layout diagram illustrating a multi-height flip-flop cell according to an embodiment of the inventive concept.

FIG. 10 is a layout diagram illustrating a multi-height flip-flop cell according to embodiments of the inventive concept. More specifically, FIG. 10 is a plan view illustrating a layout of the first cell C1*c* described with reference to FIG. 9 in a horizontal (X/Y) plane.

Referring to FIG. 10, the first cell C1*c* may be the multiple height cell disposed across the first row R1 and the second row R2 in a first direction. Although not shown in FIG. 10, the first cell C1*c* may include at least one active region. Transistors constituting the flip-flop 1 may be formed on the active region. For example, a block of the master latch M_LATCH 1 may include transistors constituting an OR gate OR1 and a NAND gate NAND1 included in the first sub-master latch circuit 11 of FIG. 1. Alternately, the block of the master latch M_LATCH 1 may include the transistors P11 to P13 and N11 to N13 included in the first sub-master latch circuit 211 of FIG. 3.

Referring to FIG. 10, in some embodiments, a block of the data inverter D_INV, the block of the master latch M_LATCH 1, and a block of the first slave latch S_LATCH 1 may be arranged in the first row R1, and a block of the output inverter Q_INV, a block of the second master latch M_LATCH 2, and a block of the second slave latch S_LATCH 2 may be arranged in the second row R2.

The block of the first master latch M_LATCH 1 and the block of the second slave latch S_LATCH 2 may be disposed adjacent in the second direction, and the block of the second master latch M_LATCH 2 and the block of the first slave latch S_LATCH 1 may be disposed adjacent in the second direction.

The first cell C1c may include first to eighth gate electrodes G31 to G38. The second gate electrode G32 and the fifth gate electrode G35 may be respectively, continuously formed over (or extend across—wholly or in art) the first row R1 and the second row R2. The second gate electrode G32 may be connected to a wiring of the clock CK to commonly transmit a clock signal to the block of the first master latch M_LATCH 1 and the block of the second slave latch S_LATCH 2. The fifth gate electrode G35 may be connected to the wiring of the clock CK to commonly transmit the clock signal to the blocks of the first slave latch S_LATCH 1 and the second master latch M_LATCH 2. That is, the complexity of wirings formed in wiring layers may be reduced by routing the clock signal through the gate electrode.

The third gate electrode G33 and the fourth gate electrode G34 may be continuously formed across the first row R1 and the second row R2. The third gate electrode G33 may be connected to a wiring of the first master node ML to commonly provide the signal at the first master node ML to the block of the first master latch M_LATCH 1 and the block of the second slave latch S_LATCH 2. Accordingly, the complexity of the second path through which the signal at the first master node ML is transmitted may be reduced. The fourth gate electrode G34 may be connected to the wiring of the second master node MLN to commonly provide the signal at the second master node MLN to the block of the first slave latch S_LATCH 1 and the block of the second master latch M_LATCH 2. That is, the complexity of wirings formed in wiring layers may be reduced by routing the signal at the first master node ML and the signal at the second master node MLN through the gate electrode.

The block of the first slave latch S_LATCH 1 may transmit a logic level of the first slave node SL to the block of the second slave latch S_LATCH 2 through the first and second wirings P31 and P23. The first wiring P31 may extend from a first wiring layer in the first direction, and the second wiring P23 may extend from a second wiring layer in the second direction. The first and second interconnections P31 and P23 may have a structure that forms the third path.

The block of the second slave latch S_LATCH 2 may transmit the logic level of the second slave node SLN to the block of the first slave latch S_LATCH 1 through the third and fourth wires P33 and P24. The third wiring P33 may extend from the first wiring layer in the first direction, and the fourth wiring P24 may extend from the second wiring layer in the second direction. The third and fourth interconnections P33 and P24 may have a structure that forms the fourth path.

In the first cell C1c of FIG. 10, routing wirings may not be aligned along at least one track (e.g., the second track TR12 or the eighth track TR24) within one row, and thus, interference between routing wirings may be reduced, and routing complexity of a flip-flop may be reduced.

Figure 11A:
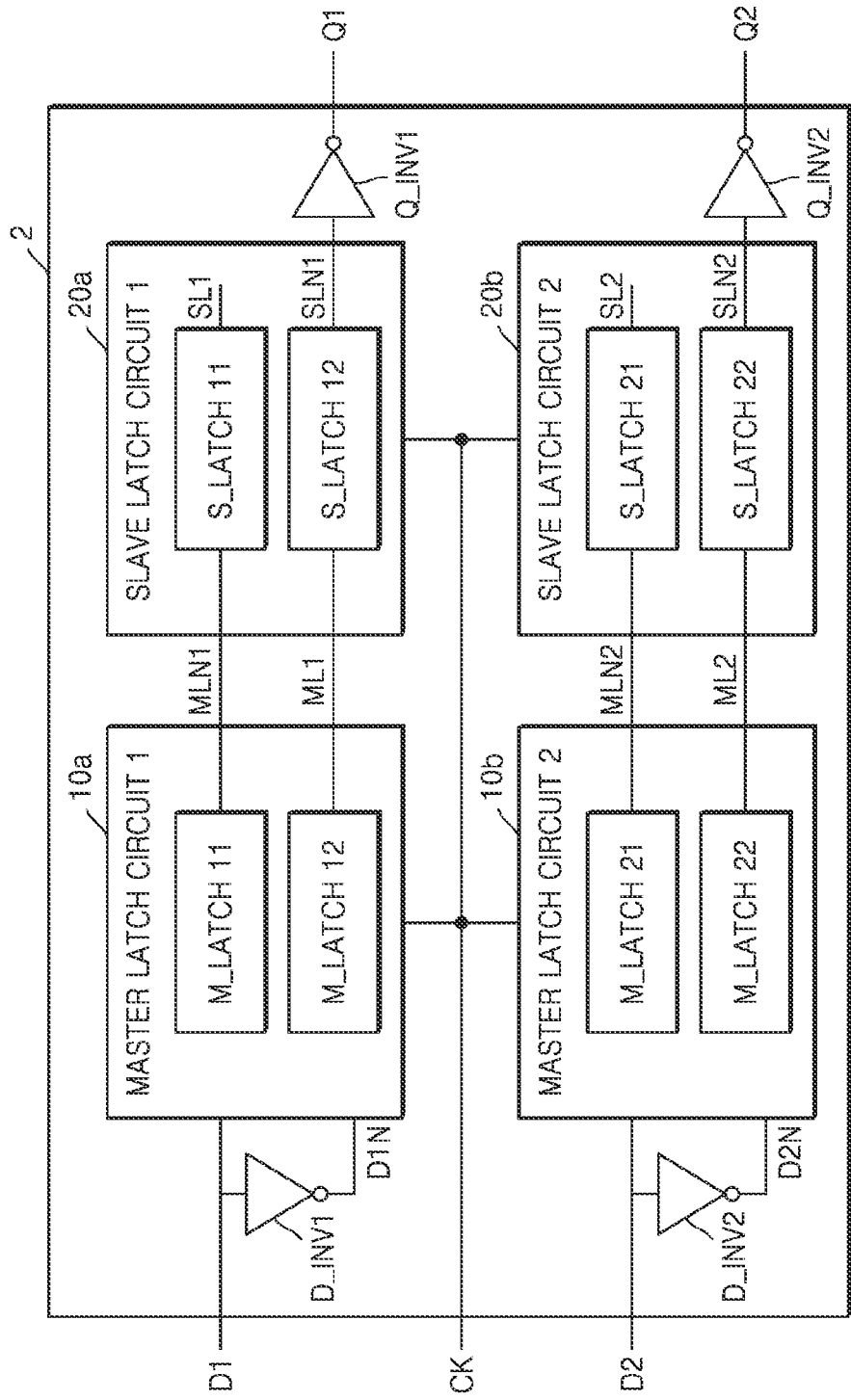
FIG. 11A is a block diagram illustrating a multi-bit flip-flop according to embodiments of the inventive concept.

FIG. 11A is a block diagram illustrating a multi-bit flip-flop 2 according to embodiments of the inventive concept. The multi-bit flip-flop 2 may be a sequential circuit that receives a first data signal D1 and a second data signal D2 and outputs a first output signal Q1 and a second output signal Q2 according to the clock signal CK. The multi-bit flip-flop 2 may be understood as a circuit in which two (2) flip-flops 1 are connected in parallel.

Referring to FIG. 11A, the multi-bit flip-flop 2 receives two data signals and outputs two output signals, but the number of data signals and the number of output signals are not limited thereto. The multi-bit flip-flop 2 may include a first master latch circuit 10a, a first slave latch circuit 20a, a second master latch circuit 10b, a second slave latch circuit 20b, first and second data inverters D_INV1 and D_INV2 and first and second output inverters Q_INV1 and Q_INV2.

The first master latch circuit 10a may include a first sub-master latch circuit M_LATCH 11 and a second sub-master latch circuit M_LATCH 12. Although not shown in FIG. 11A but as described with reference to FIG. 1, an output node MLN1 of the first sub-master latch circuit M_LATCH 11 may be connected to the second sub-master latch circuit M_LATCH 12 through the first path. An output node MN1 of the second sub-master latch circuit M_LATCH 12 may be connected to the first sub-master latch circuit M_LATCH 11 through the second path. The description of the first master latch circuit 10a may also be applied to the second master latch circuit 10b.

The first slave latch circuit 20a may include a first sub-slave latch circuit S_LATCH 11 and a second sub-slave latch circuit S_LATCH 12. Although not shown in FIG. 11A but as described with reference to FIG. 1, an output node SL1 of the first sub-slave latch circuit S_LATCH 11 may be connected to the second sub-slave latch circuit M_LATCH 12 through the third path. An output node SLN1 of the second sub-slave latch circuit S_LATCH 12 may be connected to the first sub-slave latch circuit S_LATCH 11 through the fourth path. The description of the first slave latch circuit 20a may also be applied to the second slave latch circuit 20b.

Because the multi-bit flip-flop 2 uses the clock signal CK that is not inverted, a separate clock inverter may not be provided. Accordingly, the integration of an IC including the multi-bit flip-flop 2 may be improved.

Figure 11B:
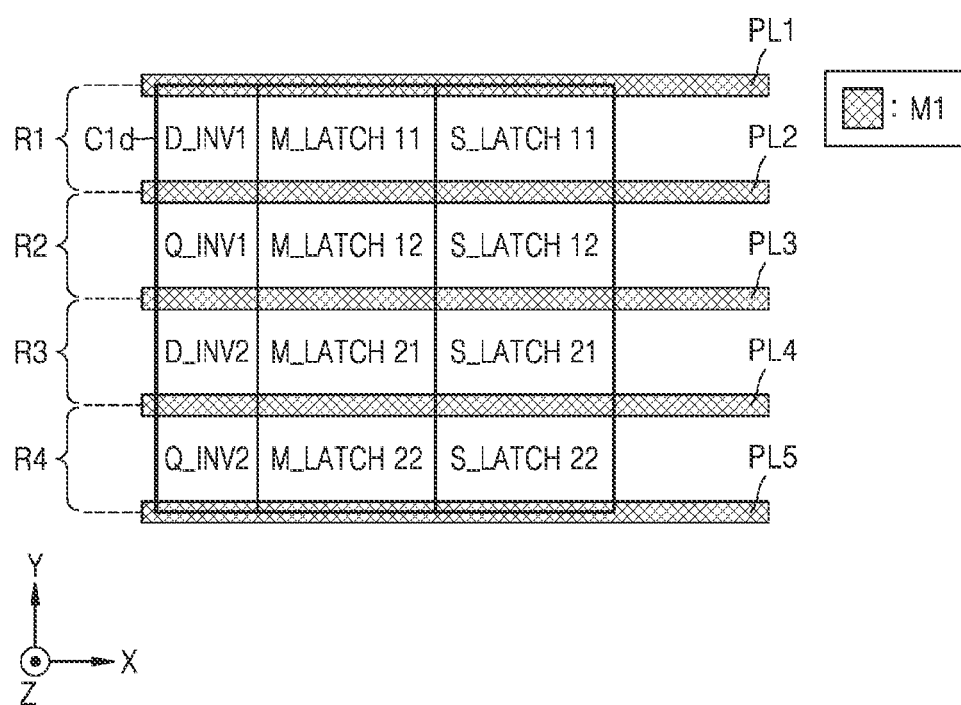
FIG. 11B is a layout diagram illustrating an IC according to embodiments of the inventive concept.

FIG. 11B is a layout diagram illustrating an IC 70 according to embodiments of the inventive concept. More specifically, FIG. 11B is a plan view illustrating the layout of the IC 70 including a first cell C1d in a horizontal (X/Y) plane. The first cell C1d may be a standard cell corresponding to the multi-bit flip-flop 2 described with reference to FIG. 8A.

The first cell C1d may be a multiple height cell disposed across the first to fourth rows R1 to R4. A block of the first sub-master latch M_LATCH 11, a block of the second sub-master latch M_LATCH 12, a block of the third sub-master latch M_LATCH 21, and a block of the fourth sub-master latch M_LATCH 22 may share a gate electrode providing the clock signal CK as described with reference to FIGS. 8 and 10. In addition, a block of the first sub-slave latch S_LATCH 11, a block of the second sub-slave latch S_LATCH 12, a block of the third sub-slave latch S_LATCH 21, and a block of the fourth sub-slave latch S_LATCH 22 may share the gate electrode providing the clock signal CK as described with reference to FIGS. 8 and 10. A plurality of blocks share the gate electrode providing a clock signal, and thus, there is no need to provide a wiring for the clock signal, thereby improving routing complexity.

The description of an arrangement of a block of the first master latch M_LATCH 1, a block of the second master latch M_LATCH 2, and a block of the first slave latch S_LATCH 1, and a block of the second slave latch S_LATCH 2 described with reference to FIGS. 7 and 9 may also be applied to the first cell C1d.

Figure 12:
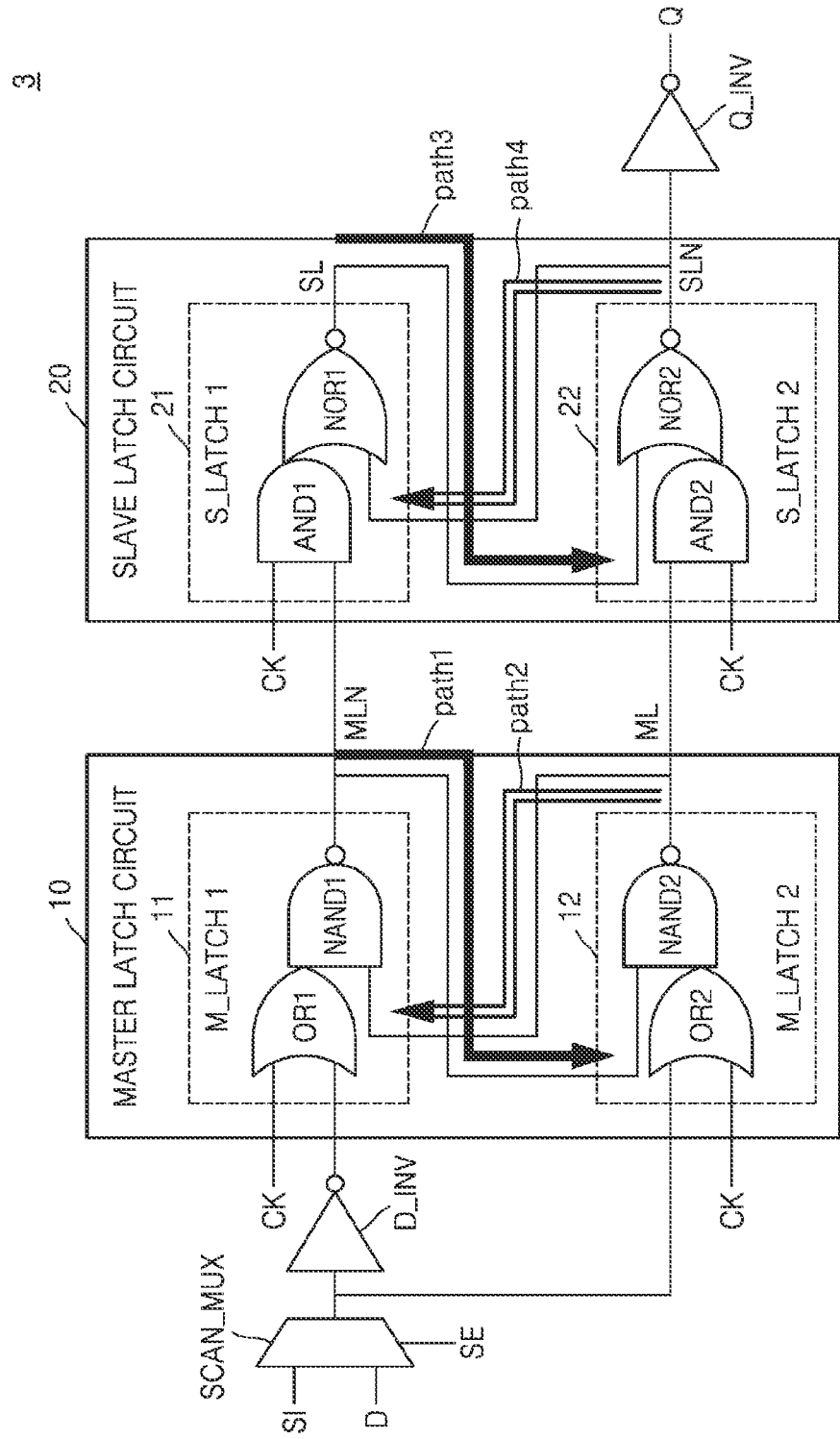
FIG. 12 is a circuit diagram illustrating a scan flip-flop according to embodiments of the inventive concept.
Figure 13:
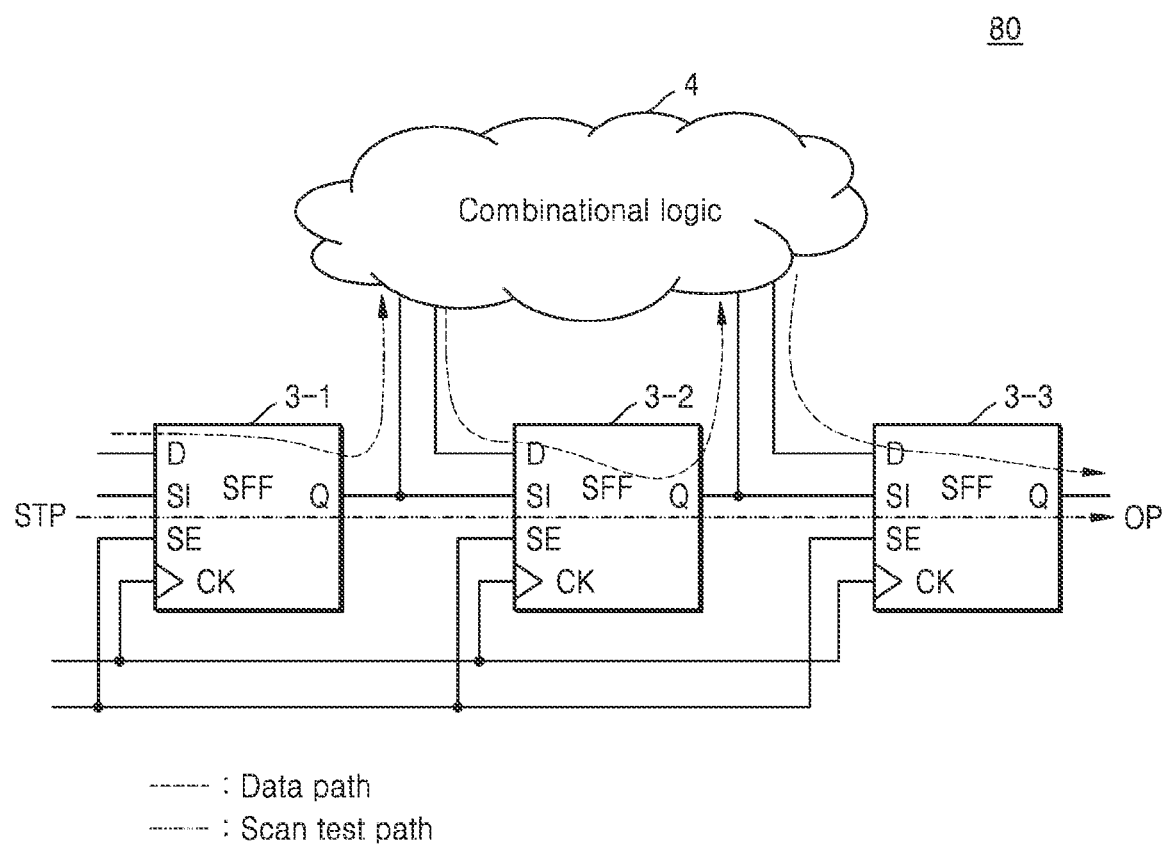
FIG. 13 is a conceptual diagram illustrating an IC including a scan flip-flop according to embodiments of the inventive concept.

FIG. 12 is a circuit diagram illustrating a scan flip-flop 3 according to embodiments of the inventive concept, and FIG. 13 is a conceptual diagram illustrating an IC 80 including the scan flip-flop 3 according to embodiments of the inventive concept. Referring to FIG. 12, as compared with the flip-flop 1 of FIG. 1, the scan flip-flop 3 of FIG. 12 may further include a scan mux circuit SCAN_MUX. The scan mux circuit SCAN_MUX may selectively output a scan input signal SI or the data signal D according to a scan enable signal SE. In FIG. 12, only one scan flip-flop 3 is illustrated, but a plurality of scan flip-flops may be included in one IC. In some embodiments, the output inverter Q_INV may receive the first slave signal SL, and generate an output signal QN by inverting the first slave signal SL.

Referring to FIG. 13, the IC 80 may include a combinational logic circuit 4 and a plurality of scan flip-flops 3-1, 3-2, and 3-3. The combinational logic circuit 4 may be a circuit that always outputs the same output data with respect to input data. The plurality of scan flip-flops 3-1, 3-2, and 3-3 may be sequential logic circuits. The sequential logic circuit may be a circuit including a memory element. The sequential logic circuit may be a circuit that outputs different output data according to a storage state even if input data is repeatedly input.

When the scan enable signal SE indicates a normal operation mode, data may be transmitted along a data path, and an original function of the IC 80 may be performed. When the scan enable signal SE indicates a scan test mode, a scan test operation may be performed by transmitting data along a scan test path. In the scan test operation, errors occurring in the plurality of scan flip-flops 3-1, 3-2, and 3-3 may be identified by comparing a scan test pattern STP with an output pattern OP. The scan test pattern STP may be an input bit string, and the output pattern OP may be an output bit string corresponding to the scan test pattern STP.

Figure 14:
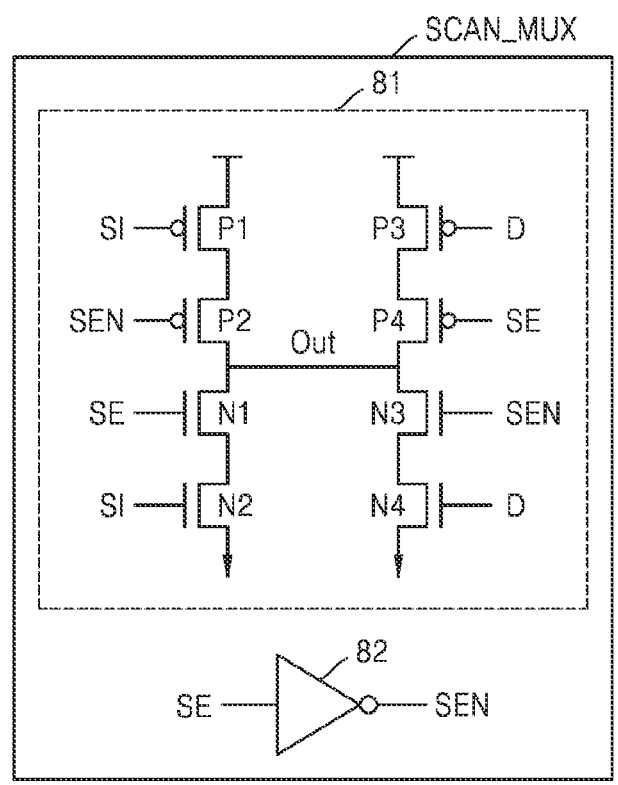
FIG. 14 is a circuit diagram illustrating a scan mux circuit according to embodiments of the inventive concept.

FIG. 14 is a circuit diagram illustrating a scan mux circuit SCAN_MUX according to embodiments of the inventive concept. Referring to FIG. 14, the scan mux circuit SCAN_MUX may include a selection circuit 81 and a scan inverter 82.

The selection circuit 81 may output the data signal D or the scan input signal SI to an output node Out according to the scan enable signal SE and an inverted scan enable signal SEN. The selection circuit 81 may include first to fourth P-type transistors P1 to P4 and first to fourth N-type transistors N1 to N4. The scan input signal SI may be received by a gate terminal of the first P-type transistor P1, the inverted scan enable signal SEN may be received by a gate terminal of the second P-type transistor P2, the data signal D may be received by a gate terminal of the third P-type transistor P3, the scan enable signal SE may be received by a gate terminal of the fourth P-type transistor P4, the scan enable signal SE may be received by a gate terminal of the first N-type transistor N1, the scan input signal SI may be received by a gate terminal of the second N-type transistor N2, the inverted scan enable signal SEN may be received by a gate terminal of the third N-type transistor N3, and the data signal D may be received by a gate terminal of the fourth N-type transistor N4.

The scan inverter 82 may receive the scan enable signal SE and generate the inverted scan enable signal SEN by inverting the scan enable signal SE. That is, although not shown, the scan inverter 82 may include a transistor receiving the scan enable signal SE at a gate terminal thereof.

The selection circuit 81 and the scan inverter 82 both include a transistor to which the scan enable signal SE is received by a gate terminal, as will be described later with reference to FIG. 15. Accordingly, upon designing a layout, when a selection circuit block and a scan inverter block share a gate electrode in which the scan enable signal SE is received, overall signal routing complexity may be reduced.

Figure 15:
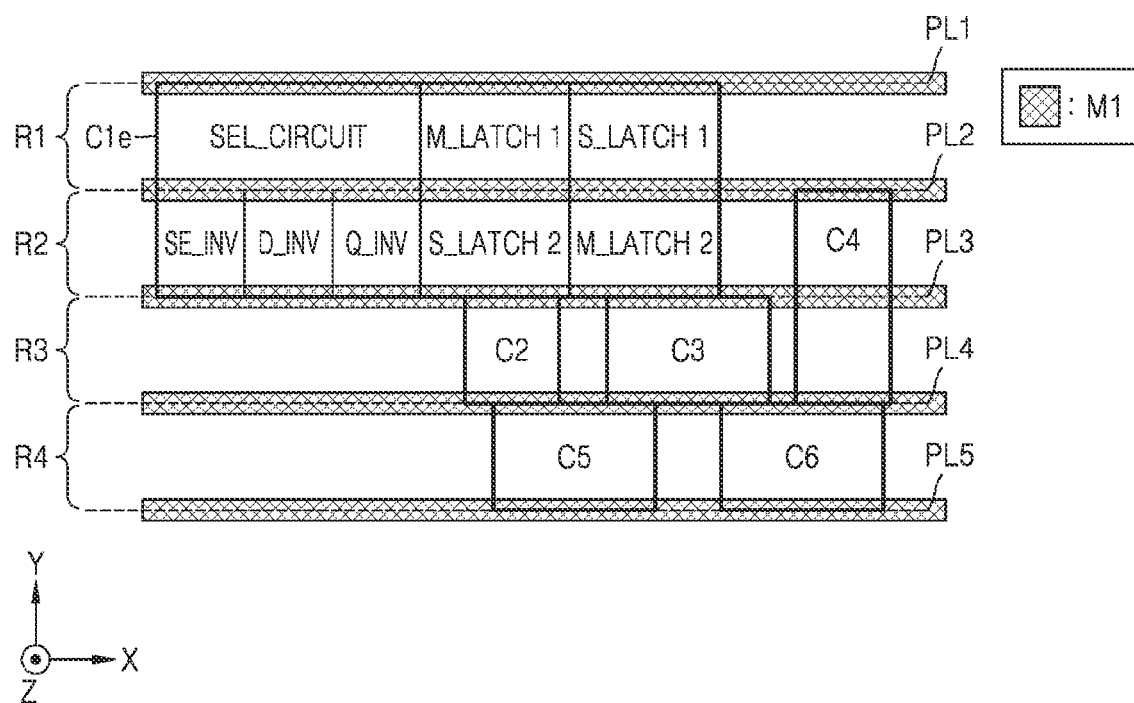
FIG. 15 is a layout diagram illustrating an IC according to embodiments of the inventive concept.

FIG. 15 is a layout diagram illustrating an IC 90 according to embodiments of the inventive concept. More specifically, FIG. 15 is a plan view illustrating the layout of the IC 90 including first to sixth cells C1e to C6 in a horizontal (X/Y) plane.

The first cell C1e included in the IC 90 may be a multiple height cell. The first cell C1d may be a standard cell corresponding to the scan flip-flop 3 described with reference to FIG. 12.

The first cell C1e may include a block of a selection circuit SEL_CIRCUIT, a block of a scan inverter SE_INV, a block of the data inverter D_INV, and a block of the output inverter Q_INV. The block of the selection circuit SEL_CIRCUIT may be disposed in the first row R1, and the block of a scan inverter SE_INV, the block of the data inverter D_INV, and the block of the output inverter Q_INV may be disposed in the second row R2. However, the embodiment is not limited thereto.

As described with reference to FIG. 14, both the block of the selection circuit SEL_CIRCUIT and the block of the scan inverter SE_INV may include transistors that receive the scan enable signal SE. Accordingly, overall signal routing complexity may be reduced because the block of the selection circuit SEL_CIRCUIT and the block of the scan inverter SE_INV share a gate electrode receiving the scan enable signal SE.

Figure 16:
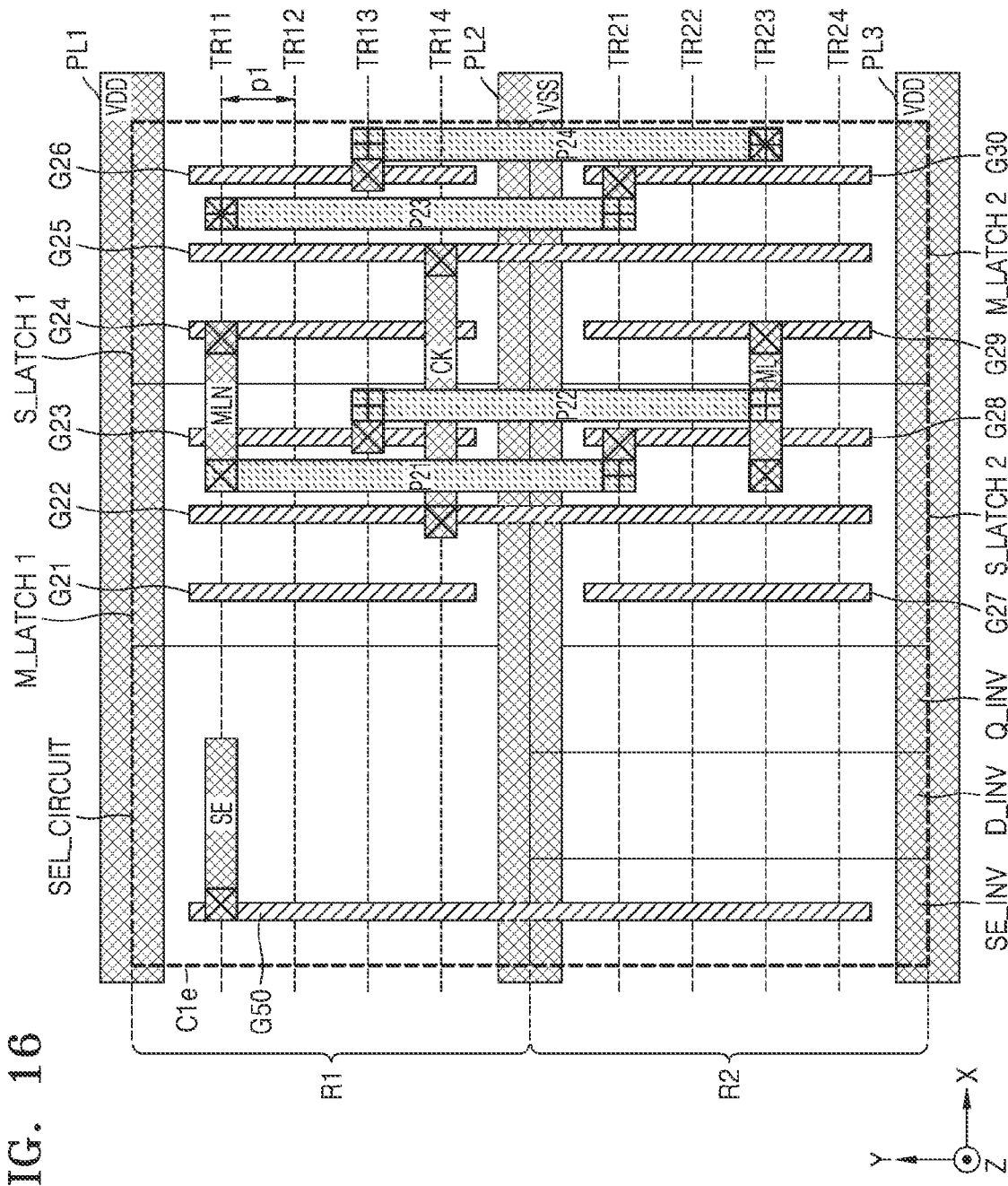
FIG. 16 is a layout diagram illustrating a scan flip-flop cell according to embodiments of the inventive concept.

FIG. 16 is a layout diagram illustrating a scan flip-flop cell according to embodiments of the inventive concept. That is, FIG. 16 is a plan view illustrating the layout of the first cell C1e described with reference to FIG. 15 in a horizontal (X/Y) plane.

Referring to FIG. 16, a gate electrode G50 may be continuously disposed in the first row R1 and the second row R2. That is, the gate electrode G50 may also be formed on a lower portion of a second power line PL2 disposed on a boundary between the first and second rows R1 and R2.

Because a block of the selection circuit SEL_CIRCUIT and a block of the scan inverter SE_INV share a gate electrode G50 that receives the scan enable signal SE, a separate wire for routing the scan enable signal SE is not required. Accordingly, overall signal routing complexity may be reduced.

Figure 17:
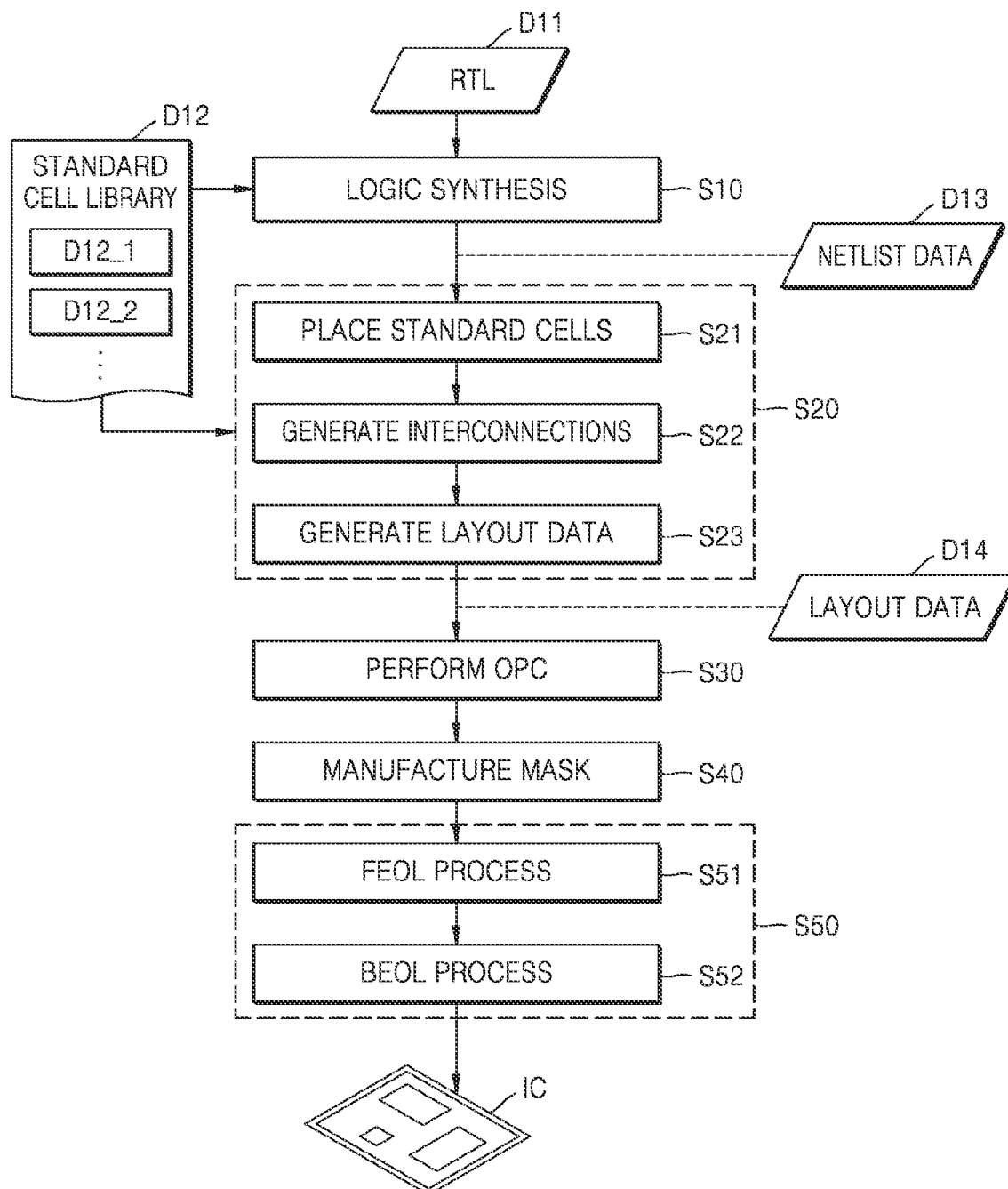
FIG. 17 is a flowchart illustrating in one example a method of fabricating an IC according to embodiments of the inventive concept.

FIG. 17 is a flowchart illustrating a method of fabricating an IC according to embodiments of the inventive concept. A cell library (or a standard cell library) D12 may include information about cells, e.g., function information, characteristic information, and layout information. As shown in FIG. 17, the cell library D12 may include first data D12_1, second data D12_2, etc. which define layouts of different flip flop cells. For example, the first data D12_1 may define a layout of a first cell like the first cell C1b of FIG. 7 in which blocks of the first and second master latches M_LATCH 1 and M_LATCH 2 are adjacent in a second direction and blocks of the first and second slave latch blocks S_LATCH 1 and S_LATCH 2 are adjacent in the second direction. The second data D12_2 may define a layout of a second cell like the first cell C1c of FIG. 9 in which the block of the first master latch M_LATCH 1 and the block of the second slave latch S_LATCH 2 are adjacent in the second direction, and the block of the first slave latch S_LATCH 1 and the block of the second master latch M_LATCH 2 are adjacent in the second direction.

In operation S10, a logic synthesis operation of generating netlist data D13 from register transmit level (RTL) data D11 may be performed. For example, a semiconductor design tool (e.g., a logic synthesis tool) may generate the netlist data D13 including a bitstream or a netlist by performing logic synthesis on the RTL data D11 with reference to the cell library D12, the RTL data D11 being created by hardware description language (HDL) such as very high-speed integrated circuit (VHSIC) hardware description language (VHDL) or Verilog. The cell library D12 may include information about a height of a standard cell, the number of pins included in the standard cell, the number of tracks corresponding to the standard cell, etc., and first and second cells may be included in the IC by referring to such information in a logic synthesis process.

In operation S20, a place and routing (P&R) operation of generating layout data D14 from the netlist data D13 may be performed. As shown in FIG. 17, the P&R operation (S20) may include multiple operations (e.g., S21, S22, and S23).

In operation S21, an operation of placing cells may be performed. For example, a semiconductor design tool (e.g., a P&R tool) may place a plurality of cells from the netlist data D13 with reference to the cell library D12. As described above, the semiconductor design tool may place the first and second cells.

In operation S22, an operation of generating interconnections may be performed. The interconnection may electrically connect an output pin to an input pin of a cell and include, for example, at least one via and at least one conductive pattern.

In operation S23, an operation of generating the layout data D14 may be performed. The layout data D14 may have, for example, a format such as generic or geometric data structure information interchange (GDSII) and include geometric information of the cells and the interconnections.

In operation S30, optical proximity correction (OPC) may be performed. OPC may indicate an operation for forming a desired-shaped pattern by correcting a distortion phenomenon such as refraction caused by characteristics of light in photolithography included in a semiconductor process for fabricating an IC, and a pattern on a mask may be determined by applying OPC to the layout data D14. In some embodiments, a layout of an IC may be limitedly modified in operation S30, and the limited modification of the IC in operation S30 is post-processing for optimizing a structure of the IC and may be referred to as design polishing.

In operation S40, an operation of manufacturing a mask may be performed. For example, patterns on a mask may be defined to form patterns on a plurality of layers by applying OPC to the layout data D14, and at least one mask (or a photomask) for forming the respective patterns of the plurality of layers may be manufactured.

In operation S50, an operation of fabricating an IC may be performed. For example, the IC may be fabricated by using the at least one mask, manufactured in operation S40, to pattern a plurality of layers. As shown in FIG. 17, operation S50 may include operations S51 and S52.

In operation S51, a front-end-of-line (FEOL) process may be performed. The FEOL process may indicate a process of forming individual devices, e.g., transistors, capacitors, and resistors, on a substrate in a process of fabricating an IC. For example, the FEOL process may include planarizing and cleaning a wafer, forming a trench, forming a well, forming a gate electrode, forming a source and a drain, and the like.

In operation S52, a back-end-of-line (BEOL) process may be performed. The BEOL process may indicate a process of interconnecting individual devices, e.g., transistors, capacitors, and resistors, in a process of fabricating an IC. For example, the BEOL process may include silicidation of gate, source, and drain regions, adding a dielectric, performing planarization, forming a hole, adding a metal layer, forming a via, forming a passivation layer, and the like. Thereafter, the IC may be packaged in a semiconductor package and used as a component of various applications.

Figure 18:
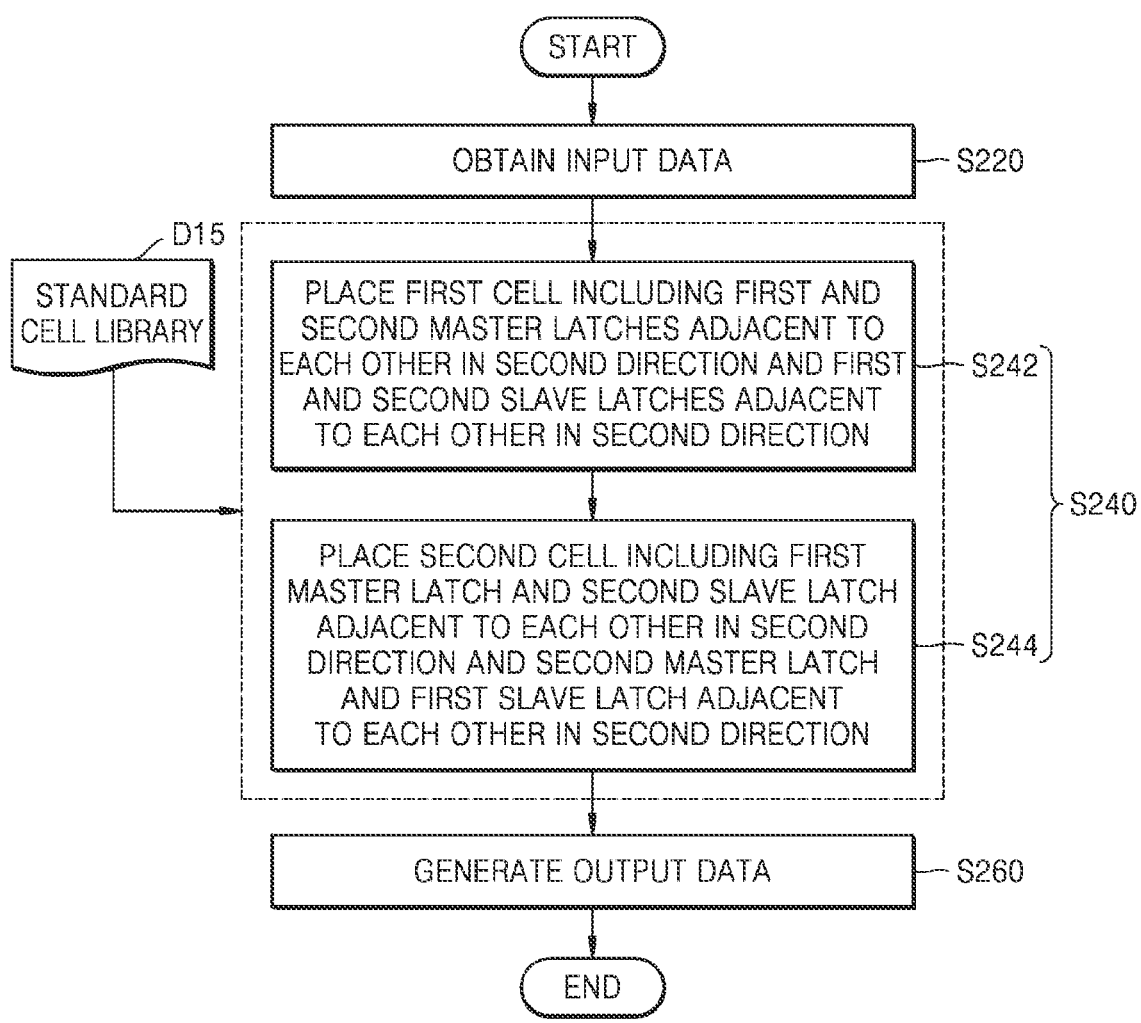
FIG. 18 is a flowchart illustrating in one example a method of designing an IC according to embodiments of the inventive concept.

FIG. 18 is a flowchart illustrating a method of designing an IC according to embodiments of the inventive concept. The method of FIG. 18 may be performed by a computing system (e.g., 130 of FIG. 20) including at least one processor configured to execute a series of instructions. As shown in FIG. 18, the method of designing an IC may include operations S220, S240, and S260.

In operation S220, an operation of obtaining input data may be performed. The input data may indicate data defining the IC and include, for example, the netlist data D13 described with reference to FIG. 17. The netlist data D13 may include information about cells and interconnections included in the IC.

In operation S240, a P&R operation may be performed in relation to a cell library D12. Operation S240 may include multiple operations (e.g., S242 and S244).

In operation S242, an operation of placing a first cell may be performed. The first cell is a flip-flop cell, and as shown in FIG. 1, may include the first and second master latches M_LATCH 1 and M_LATCH 2 and the first and second slave latches S_LATCH 1 and S_LATCH 2. In the first cell, blocks of the first and second master latches M_LATCH 1 and M_LATCH 2 may be adjacent in a second direction, and blocks of the first and second slave latches S_LATCH 1 and S_LATCH 2 may be adjacent in the second direction. That is, the first cell may be the first cell C1b described with reference to FIGS. 7 and 8.

In operation S244, an operation of placing a second cell may be performed. The second cell is a flip-flop cell, and the second data D12_2 may define a layout of the second cell like the first cell C1c of FIG. 9 in which the block of the first master latch M_LATCH 1 and the block of the second slave latch S_LATCH 2 are adjacent in the second direction, the block of the first master latch M_LATCH 1 and the block of the second slave latch S_LATCH 2 are adjacent in the second direction, and the block of the first slave latch S_LATCH 1 and the block of the second master latch M_LATCH 2 are adjacent in the second direction. That is, the second cell may be the first cell C1c described with reference to FIGS. 9 and 10.

In operation S260, an operation of generating output data may be performed. The output data may indicate data defining a layout of the IC and include, for example, the layout data D14 described with reference to FIG. 17.

Figure 19:
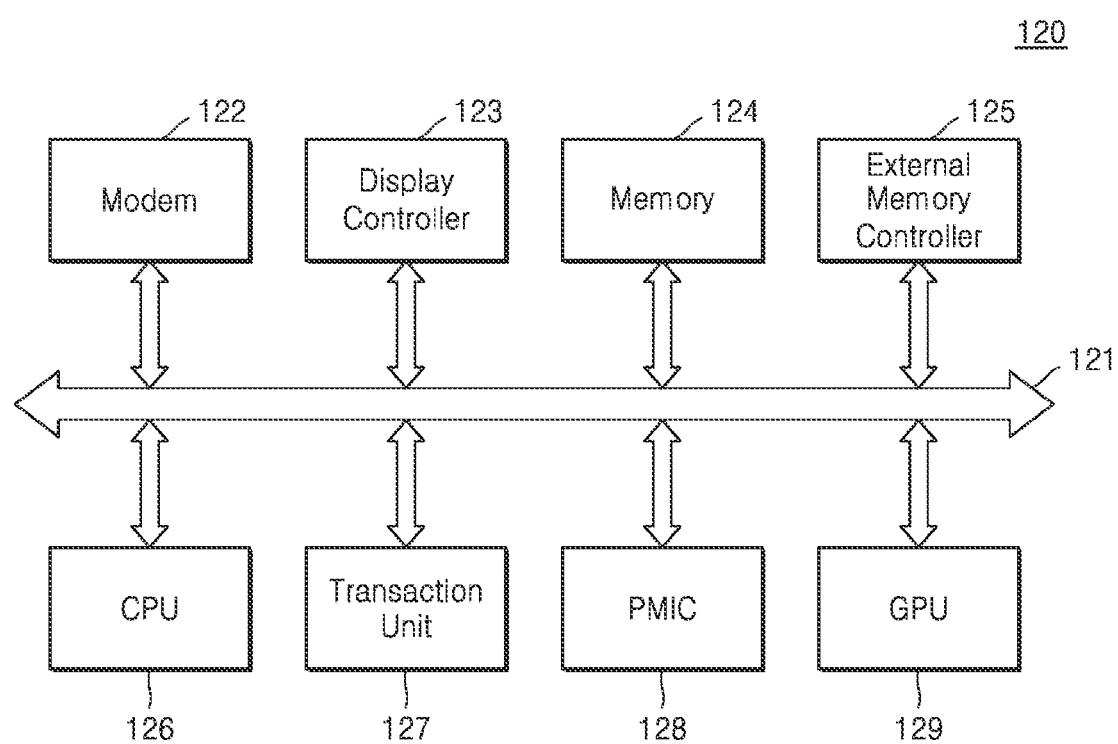
FIG. 19 is a block diagram illustrating a System-on-Chip (SoC) according to embodiments of the inventive concept.

FIG. 19 is a block diagram illustrating a system on chip (SoC) 120 according to embodiments of the inventive concept. The SoC 120 is a semiconductor device and may include an IC according to an embodiment of the inventive concept. The SoC 120 is obtained by implementing, in a single chip, complicated functional blocks, such as an intellectual property (IP) block, for performing various functions, and according to embodiments of the inventive concept, flip-flop cells performing signal routing through gate electrodes may be included in the respective functional blocks in the SoC 120. Accordingly, the SoC 120 having reduced overall signal routing complexity may be provided.

Referring to FIG. 19, the SoC 120 may include a modem 122, a display controller 123, a memory 124, an external memory controller 125, a central processing unit (CPU) 126, a transaction unit 127, a power management integrated circuit (PMIC) 128, and a graphics processing unit (GPU) 129, and the functional blocks of the SoC 120 may communicate with each other via a system bus 121.

The CPU 126 capable of generally controlling an operation of the SoC 120 may control operations of the other functional blocks, that is, the modem 122, the display controller 123, the memory 124, the external memory controller 125, the CPU 126, the transaction unit 127, the PMIC 128, and the GPU 129. The modem 122 may demodulate a signal received from the outside of the SoC 120, or modulate a signal generated inside the SoC 120 and transmit the modulated signal to the outside. The external memory controller 125 may control an operation of transmitting and receiving data to and from an external memory device connected to the SoC 120. For example, a program and/or data stored in the external memory device may be provided to the CPU 126 or the GPU 129 under control of the external memory controller 125. The GPU 129 may execute program instructions associated with graphics processing. The GPU 129 may receive graphics data through the external memory controller 125 and transmit graphic data processed by the GPU 129 to the outside of the SoC 120 through the external memory controller 125. The transaction unit 127 may monitor a data transaction of each functional block, and the PMIC 128 may control power to be supplied to each functional block, under control of the transaction unit 127. The display controller 123 may transmit data generated inside the SoC 120 to a display (or a display device) outside the SoC 120 by controlling the display.

The memory 124 may include a nonvolatile memory such as electrically erasable programmable read-only memory (EEPROM), flash memory, phase change random access memory (PRAM), resistance random access memory (RRAM), nano floating gate memory (NFGM), polymer random access memory (PoRAM), magnetic random access memory (MRAM), or ferroelectric random access memory (FRAM) or a volatile memory such as dynamic random access memory (DRAM), static random access memory (SRAM), mobile DRAM, double data rate synchronous dynamic random access memory (DDR SDRAM), low power DDR (LPDDR) SDRAM, graphic DDR (GDDR) SDRAM, or Rambus dynamic random access memory (RDRAM).

Figure 20:
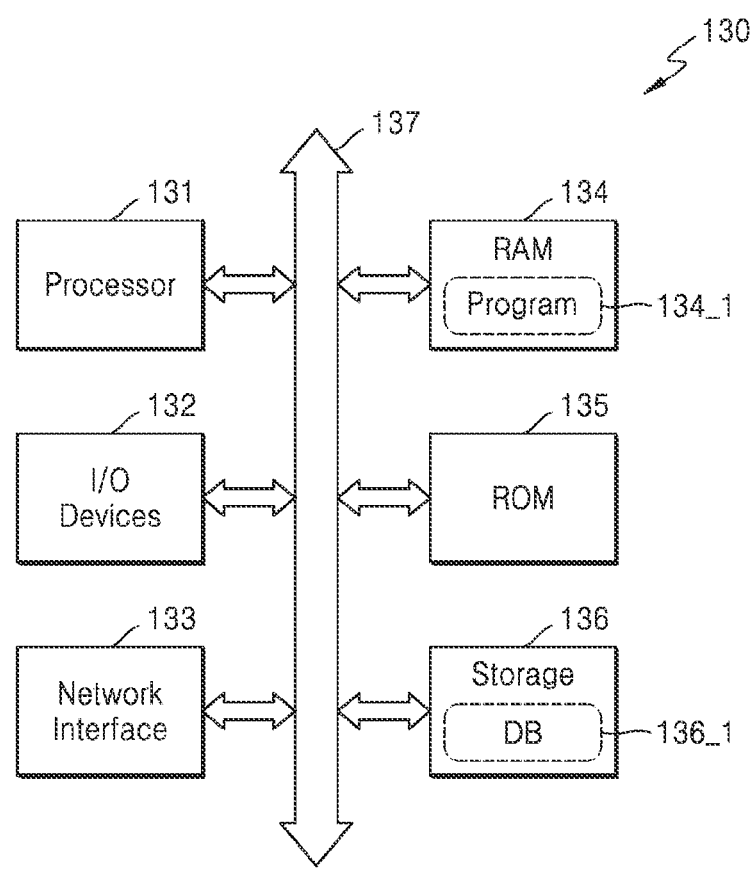
FIG. 20 is a block diagram illustrating a computing system including a memory storing a program according to embodiments of the inventive concept.

FIG. 20 is a block diagram illustrating a computing system 130 that may include a memory storing a program according to embodiments of the inventive concept. At least some of operations included in a method of fabricating an IC (e.g., the method of FIG. 17) and operations included in a method of designing an IC (e.g., the method of FIG. 18), according to embodiments of the inventive concept, may be performed by the computing system 130.

The computing system 130 may be a stationary computing system such as a desktop computer, a workstation, or a server or a portable computing system such as a laptop computer. As shown in FIG. 20, the computing system 130 may include a processor 131, input/output (I/O) devices 132, a network interface 133, random access memory (RAM) 134, read only memory (ROM) 135, and a storage 136. The processor 131, the I/O devices 132, the network interface 133, the RAM 134, the ROM 135, and the storage 136 may be connected to a bus 137 and communicate with each other via the bus 137.

The processor 131 may be referred to as a processing unit and include at least one core, e.g., a micro-processor, an application processor (AP), a digital signal processor (DSP), and a GPU, capable of executing an arbitrary instruction set (e.g., Intel Architecture-32 (IA-32), 64-bit extended IA-32, x86-64, PowerPC, Sparc, million instructions per second (MIPS), advanced RISC (reduced instruction set computer) machine (ARM), or IA-64). For example, the processor 131 may access a memory, i.e., the RAM 134 or the ROM 135, via the bus 137 and execute instructions stored in the RAM 134 or the ROM 135.

The RAM 134 may store a program 134_1 for fabricating an IC, according to an embodiment of the inventive concept, or at least a portion of the program 134_1, and the program 134_1 may allow the processor 131 to perform at least some of operations included in the method of fabricating an IC (e.g., the method of FIG. 16) and operations included in the method of designing an IC (e.g., the method of FIG. 17). That is, the program 134_1 may include a plurality of instructions executable by the processor 131, and the plurality of instructions included in the program 134_1 may allow the processor 131 to perform at least some of the operations included in, for example, the flowcharts described with reference to FIGS. 17 and 18.

The storage 136 may not lose stored data even when power supplied to the computing system 130 is cut off. For example, the storage 136 may include a nonvolatile memory device or a storage medium such as magnetic tape, an optical disc, or a magnetic disc. In addition, the storage 136 may be detachable from the computing system 130. The storage 136 may store the program 134_1 according to an embodiment of the inventive concept, and the program 134_1 or at least a portion of the program 134_1 may be loaded from the storage 136 to the RAM 134 before the program 134_1 is executed by the processor 131. Alternately, the storage 136 may store a file created by a program language, and the program 1341 generated from the file by a compiler or the like or at least a portion of the program 134_1 may be loaded to the RAM 134. In addition, as shown in FIG. 20, the storage 136 may include a database 136_1, and the database 136_1 may include information required to design an IC, e.g., the standard cell library D12 of FIG. 17.

The storage 136 may store data to be processed by the processor 131 or data processed by the processor 131. That is, the processor 131 may generate data by processing data stored in the storage 136 and store the generated data in the storage 136, according to the program 1341. For example, the storage 136 may store the RTL data D11, the netlist data D13, and/or the layout data D14 of FIG. 17.

The I/O devices 132 may include input devices such as a keyboard and a pointing device and include output devices such as a display device and a printer. For example, through the I/O devices 132, a user may trigger execution of the program 134_1 by the processor 131, input the RTL data D11 and/or the netlist data D13 of FIG. 17, and confirm the layout data D14 of FIG. 17.

The network interface 133 may provide access to a network outside the computing system 130. For example, the network may include a plurality of computing systems and communication links, and the communication links may include wired links, optical links, radio links, or other arbitrary-types of links.

The inventive concept has been particularly shown and described with reference to certain illustrated embodiments thereof. However, those skilled in the art will understand that various changes in form and details may be made therein without departing from the scope of the inventive concept, as defined by the following claims.

What is claimed is:

1. A flip-flop disposed in an integrated circuit (IC) layout, the IC circuit layout including alternating power lines defining rows of the IC circuit layout there between, the rows each extending lengthwise in a first direction, the flip-flop comprising:
a first sub-master latch disposed in one of a first row and an adjacent second row among the rows of the IC circuit layout, and configured to generate a signal at a first node in response to a first data signal, a clock signal, and a signal at a second node;
a second sub-master latch disposed in the other one of the first row and the second row, and configured to generate a signal at the second node in response to an inverted first data signal, the clock signal, and the signal at the first node;
a first sub-slave latch disposed in one of the first row and the second row, and configured to generate a signal at a third node in response to the clock signal, the signal at the first node, and a signal at a fourth node; and
a second sub-slave latch disposed in the other one of the first row and the second row, and configured to generate the signal at the fourth node in response to the clock signal, the signal at the second node, and the signal at the third node,
wherein the first sub-master latch and the second sub-master latch are adjacently disposed in a second direction in different ones of the first and second rows, the second direction perpendicular to the first direction, and
the first sub-slave latch and the second sub-slave latch are adjacently disposed in the second direction in different ones of the first and second rows.

2. The flip-flop of claim 1, further comprising:
a first gate electrode extending in the second direction across the first row and the second row and configured to commonly transmit the clock signal to the first sub-master latch and the second sub-master latch.

3. The flip-flop of claim 1, further comprising:
a first wiring line disposed in the first row, extending in the first direction, and transmitting the signal at the first node to the first sub-slave latch; and
a second wiring line disposed in the second row, extending in the first direction, and transmitting the signal at the second node to the second sub-slave latch.

4. The flip-flop of claim 3, further comprising:
a third wiring line extending in the second direction across the first row and the second row and connected to the first wiring line to transmit the signal at the first node to the second sub-master latch; and
a fourth wiring line extending in the second direction across the first row and the second row and connected to the second wiring line to transmit the signal at the second node to the first sub-master latch.

5. The flip-flop of claim 1, further comprising:
a second gate electrode extending in the second direction across the first row and the second row and configured to commonly transmit the clock signal to the first sub-slave latch and the second sub-slave latch.

6. The flip-flop of claim 5, further comprising:
a fifth wiring line extending in the second direction across the first row and the second row and configured to transmit the signal at the third node to the second sub-slave latch; and
a sixth wiring line extending in the second direction across the first row and the second row and configured to transmit the signal at the fourth node to the first sub-slave latch.

7. The flip-flop of claim 1, further comprising:
a first input inverter disposed in the first row, and configured to receive the first data signal and invert the first data signal; and
a first output inverter disposed in the second row and configured to invert the signal at the fourth node.

8. The flip-flop of claim 1, further comprising:
a selection circuit disposed in the first row and configured to output one of a first inverted signal of a scan input signal and a second inverted signal of the first data signal in response to a scan enable signal;
a second input inverter disposed in the second row, configured to receive the second inverted signal, and invert the second inverted signal; and
a second output inverter disposed in the second row and configured to invert the signal at the fourth node.

9. The flip-flop of claim 8, further comprising,
a scan inverter disposed in the second row, and configured to receive the scan enable signal and generate an inverted scan enable signal by inverting the scan enable signal.

10. The flip-flop of claim 9, further comprising:
a third gate electrode extending in the second direction across the first row and the second row and configured to commonly transmit the scan enable signal to the selection circuit and the scan inverter.

11. The flip-flop of claim 1, wherein the power lines each extend in the first direction, and are respectively disposed at a boundary between adjacent rows, and
wherein the power lines defining the first and second rows are configured to supply power to transistors included in at least one of the first sub-master latch, the second sub-master latch, the first sub-slave latch, and the second sub-slave latch.

12. A flip-flop disposed in an integrated circuit (IC) layout, the IC circuit layout including alternating power lines defining rows of the IC circuit layout there between, the rows extending lengthwise in a first direction, the flip-flop comprising:
a first sub-master latch disposed in one of a first row and an adjacent second row among the rows of the IC circuit layout, and configured to generate a signal at a first node in response to a first data signal, a clock signal, and a signal at a second node;
a second sub-master latch disposed in the other one of the first row and the second row, and configured to generate a signal at the second node in response to an inverted first data signal, the clock signal, and the signal at the first node;
a first sub-slave latch disposed in one of the first row and the second row, and configured to generate a signal at a third node in response to the clock signal, the signal at the first node, and a signal at a fourth node;
a second sub-slave latch disposed in the other one of the first row and the second row, and configured to generate the signal at the fourth node in response to the clock signal, the signal at the second node, and the signal at the third node, wherein the first sub-master latch and the second sub-slave latch are adjacently disposed in a second direction in different ones of the first and second rows, the second direction perpendicular to the first direction, and the first sub-slave latch and the second sub-master latch are adjacently disposed in the second direction in different ones of the first and second rows.

13. The flip-flop of claim 12, further comprising:
a first gate electrode extending in the second direction across the first row and the second row, and configured to commonly transmit the clock signal to the first sub-master latch and the second sub-slave latch; and
a second gate electrode extending in the second direction across the first row and the second row, and configured to commonly transmit the clock signal to the first sub-slave latch and the second sub-master latch.

14. The flip-flop of claim 13, further comprising:
a third gate electrode extending in the second direction across the first and second rows and configured to commonly transmit a signal at the second node to the first sub-master latch and the second sub-slave latch.

15. The flip-flop of claim 14, further comprising:
a first wiring line disposed in the second row, extending in the first direction, and connected to the third gate electrode to transmit the signal at the second node to the second sub-slave latch.

16. The flip-flop of claim 13, further comprising:
a fourth gate electrode extending in the second direction across the first and second rows and configured to commonly transmit a signal at the first node to the second sub-master latch and the first sub-slave latch.

17. The flip-flop of claim 16, further comprising:
a second wiring line disposed in the first row, extending in the first direction, and connected to the fourth gate electrode to transmit the signal at the first node to the first sub-slave latch.

18. The flip-flop of claim 12, further comprising:
a fifth sub-master latch disposed in one of a third row adjacent to the second row and a fourth row adjacent to the third row, and configured to generate a signal at a fifth node in response to a second data signal, the clock signal, and a signal at a sixth node;
a sixth sub-master latch disposed in one of the third row and the fourth row, and configured to generate the signal at the sixth node in response to an inverted second data signal, the clock signal, and the signal at the fifth node;
a fifth sub-slave latch disposed in one of the third row and the fourth row, and configured to generate a signal at a seventh node in response to the clock signal, the signal at the fifth node, and a signal at an eighth node; and
a sixth sub-slave latch disposed in one of the third row and the fourth row, and configured to generate the signal at the eighth node in response to the clock signal, the signal at the sixth node, and the signal at the seventh node, wherein the third sub-master latch and the fourth sub-master latch are adjacently disposed in the second direction in different ones of the third and fourth rows, and the fourth sub-slave latch and the third sub-slave latch are adjacently disposed in the second direction in different ones of the third and fourth rows.

19. A design method for an integrated circuit (IC) layout including a flip-flop, wherein the IC circuit layout includes alternating power lines defining adjacent first and second rows of the IC circuit layout there between, the first and second rows extending lengthwise in a first direction, and wherein the flip-flop includes a first master latch, a second master latch, a first slave latch and a second slave latch, the method comprising:
placing a first cell in response to input data defining the IC, wherein the first cell includes the first master latch and the second master latch adjacent in a second direction in different ones of the first and second rows, and the first slave latch and the second slave latch adjacent in the second direction in different ones of the first and second rows, the second direction perpendicular to the first direction;
placing a second cell in response to input data defining the IC, wherein the second cell includes the first master latch and the second slave latch adjacent in the second direction in different ones of the first and second rows, and the first slave latch and the second master latch adjacent in the second direction in different ones of the first and second rows; and
generating output data defining the layout of the IC.

20. The method of claim 19, wherein the first cell further includes:
a first gate electrode extending in the second direction across the first row and the second row, and configured to commonly transmit a clock signal to the first master latch and the second master latch; and
a second gate electrode extending in the second direction across the first row and the second row, and configured to commonly transmit the clock signal to the first slave latch and the second slave latch.

21. The method of claim 20, wherein the second cell further includes:
a third gate electrode extending in the second direction across the first row and the second row, and configured to commonly transmit a clock signal to the first master latch and the second slave latch;
a fourth gate electrode extending in the second direction across the first row and the second row, and configured to commonly transmit the clock signal to the first slave latch and the second master latch;
a fifth gate electrode extending in the second direction across the first row and the second row, and configured to commonly transmit a signal at an output node of the first master latch to the first slave latch and the second master latch; and
a sixth gate electrode extending in the second direction across the first row and the second row, and configured to commonly transmit a signal at an output node of the second master latch to the first master latch and the second slave latch.

* * * * *